United States Patent [19]
Tokunaga

[11] Patent Number: 5,719,388
[45] Date of Patent: Feb. 17, 1998

[54] APPARATUS FOR PROCESSING AN OUTPUT SIGNAL FROM AN AREA SENSOR HAVING A PLURALITY OF PHOTOELECTRIC CONVERSION ELEMENTS

[75] Inventor: Tatsuyuki Tokunaga, Yono, Japan

[73] Assignee: Canon Kabushiki Kaisha, Tokyo, Japan

[21] Appl. No.: 706,522

[22] Filed: Sep. 4, 1996

Related U.S. Application Data

[63] Continuation of Ser. No. 591,943, Jan. 23, 1996, abandoned, which is a continuation of Ser. No. 207,095, Mar. 8, 1994, abandoned.

[30] Foreign Application Priority Data

Mar. 9, 1993  [JP]  Japan .................................. 5-048070

[51] Int. Cl.$^6$ ........................................ H01J 40/14
[52] U.S. Cl. .................. 250/201.2; 250/221; 396/51
[58] Field of Search ................ 250/201.1, 201.2, 250/221, 206.1, 206.2; 356/141.1, 141.2; 396/51, 82, 121

[56] References Cited

U.S. PATENT DOCUMENTS

| | | | |
|---|---|---|---|
| 4,287,410 | 9/1981 | Crane et al. ........................ | 250/201 |
| 4,969,005 | 11/1990 | Tokunaga .......................... | 354/414 |
| 4,996,413 | 2/1991 | McDaniel et al. ................ | 250/208.1 |
| 5,016,282 | 5/1991 | Tomono et al. ................... | 382/2 |
| 5,036,347 | 7/1991 | Tsunekawa et al. .............. | 354/400 |
| 5,140,358 | 8/1992 | Tokunaga et al. ................ | 354/400 |
| 5,182,443 | 1/1993 | Suda et al. ........................ | 250/201.2 |
| 5,214,466 | 5/1993 | Nagano et al. ................... | 354/402 |

FOREIGN PATENT DOCUMENTS

| | | |
|---|---|---|
| 1-274736 | 11/1989 | Japan . |
| 4-240438 | 8/1992 | Japan . |
| 4-347131 | 12/1992 | Japan . |

*Primary Examiner*—Edward P. Westin
*Assistant Examiner*—Kevin Pyo
*Attorney, Agent, or Firm*—Fitzpatrick, Cella, Harper & Scinto

[57] ABSTRACT

A signal processing apparatus, which includes an area sensor for receiving an eyeball image, detects a visual axis by processing a photoelectric conversion signal from the area sensor. An area enough to detect the visual axis is set within the area sensor before a signal is taken out to detect the visual axis. The photoelectric concretion element in the set area is subjected to an A/D conversion to process the signal.

35 Claims, 24 Drawing Sheets

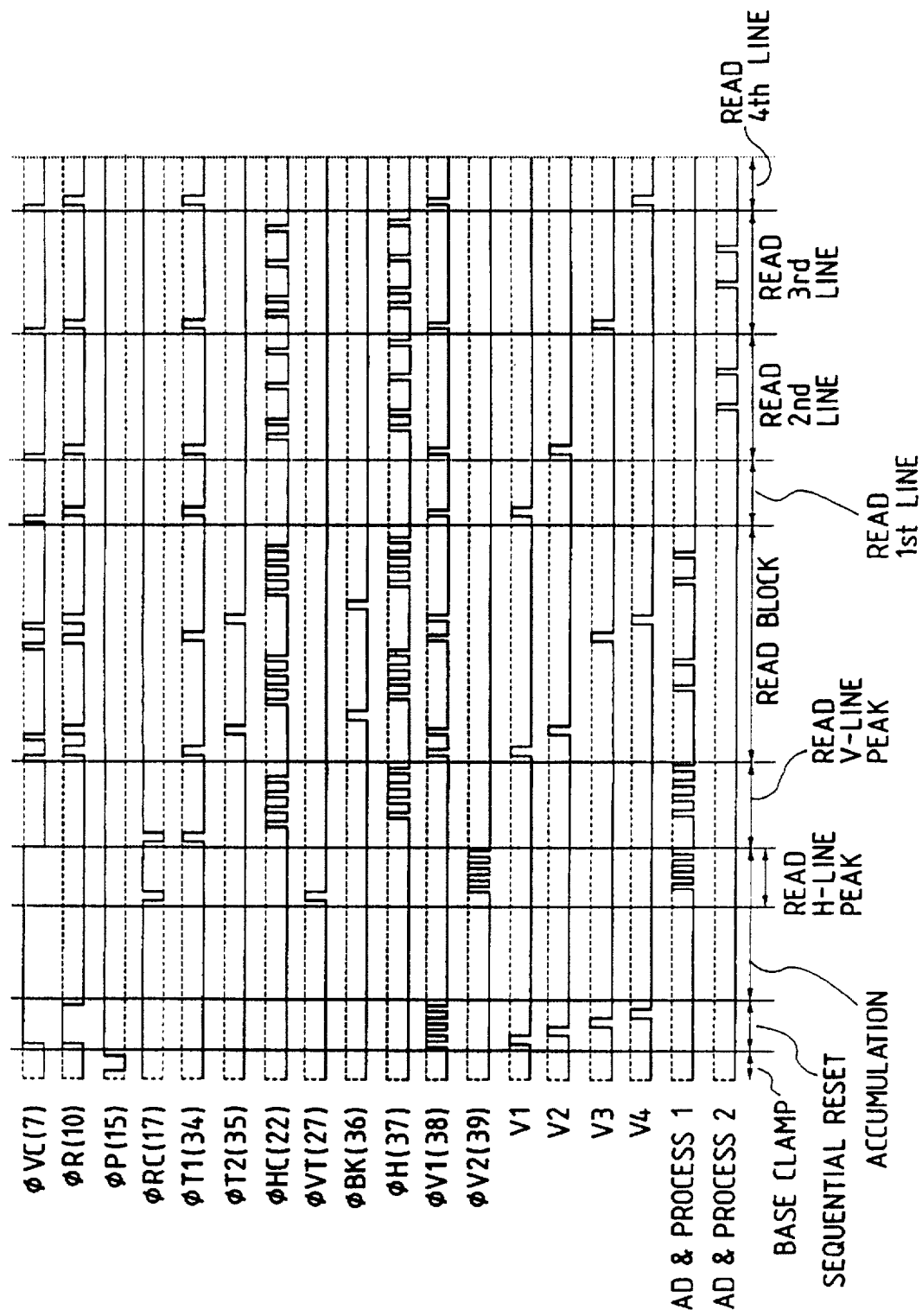

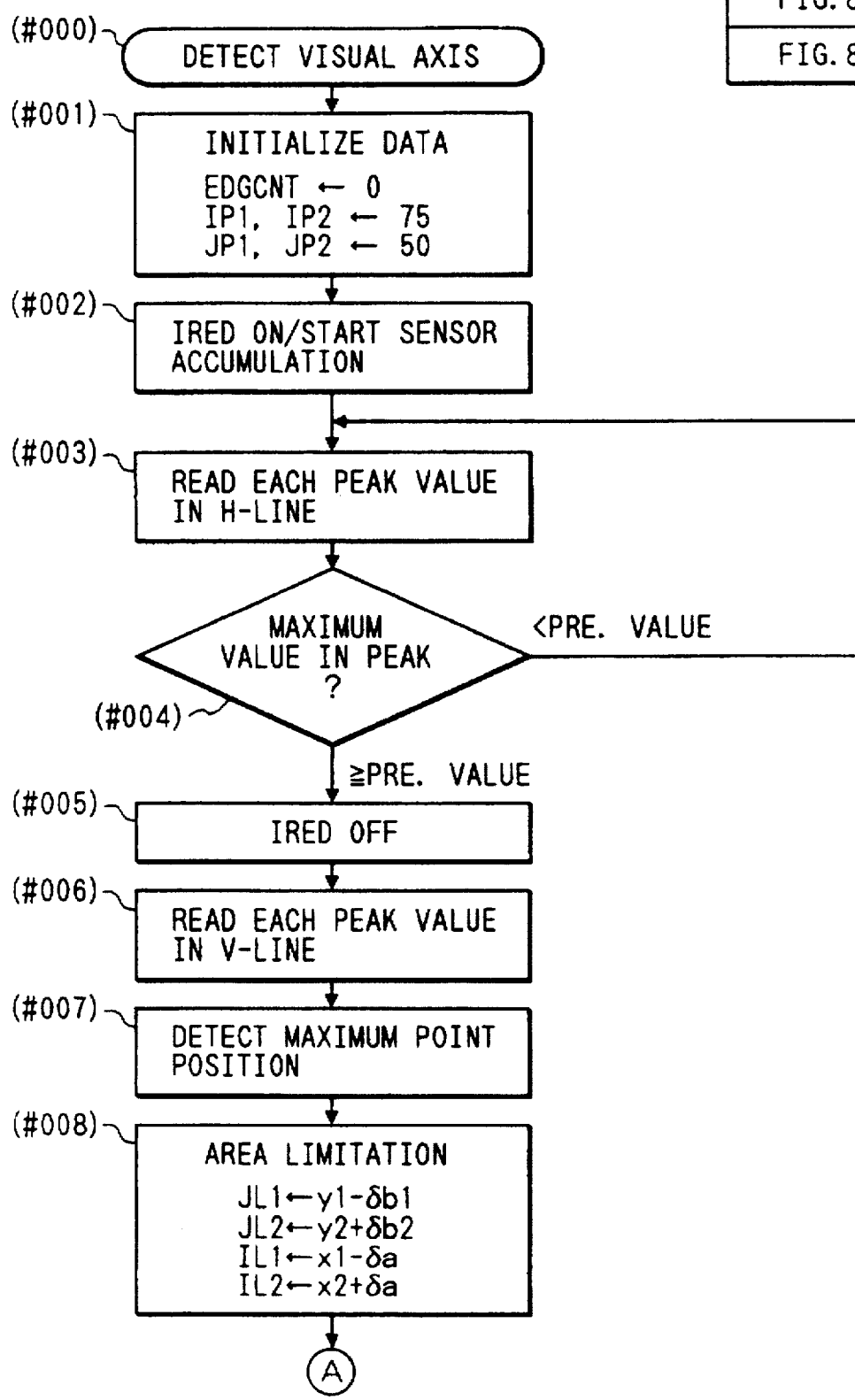
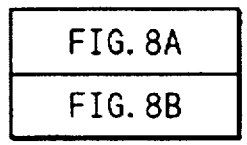
FIG. 8A
FIG. 8

APPARATUS FOR PROCESSING AN OUTPUT SIGNAL FROM AN AREA SENSOR HAVING A PLURALITY OF PHOTOELECTRIC CONVERSION ELEMENTS

This application is a continuation of application Ser. No. 08/591,943 filed Jan. 23, 1996, which is a continuation of application Ser. No. 08/207,095 filed Mar. 8, 1994, both now abandoned.

BACKGROUND OF THE INVENTION

1. Field of the Invention

The present invention relates to a visual axis detection apparatus in which a visual axis (gazing point) of an observer using an optical apparatus such as a camera is detected.

2. Related Background Art

Conventionally, various proposals have been made as for the so-called visual axis (line of sight) detector (for example, eye camera) which detects which position on an observing plane a viewer observes.

Japanese patent laid-open Application No. 1-274736, for example, discloses that a visual axis is obtained by projecting a parallel light beam from a light source onto the anterior eye portion of an observer's eyeball and utilizing the positions of a cornea reflection image due to the reflection light from a cornea and a pupil image.

FIGS. 5A, 5B, 6, 7A, 7B and 7C are diagrams used for explaining the principle of a visual axis detecting method.

In an explanation with reference to FIG. 6, infrared light emitting diodes (hereinafter referred to as IRED) 13a and 13b are substantially symmetrically arranged in the X-direction with respect to the optical axis ax1 of the light receiving lens 12 to divergently illuminate an eyeball of a photographer.

The infrared rays emitted by the IREDs 13a and 13b are illuminated onto the cornea 16 of the eyeball 15. By the light receiving lens 12, cornea reflection images d and e formed by each part of the infrared rays reflected by the surface of the cornea 16 are condensed to form the images on the positions d' and e' on the image sensor 14.

The image of the eye pupil of an eyeball illuminated by the IRED is formed on the image sensor 14. When the center C of a circle (referred to a pupil circle) made by the boundary between the eye pupil and the iris is defined by Xc on the X-coordinate, the X-coordinate on the image sensor is defined by Xc' (not shown).

FIG. 5A shows an eyeball image projected on the surface of the image sensor 14 in FIG. 2. FIG. 5B shows an image signal output taken along the line (I)–(I)' in FIG. 5A.

Referring to FIG. 5A, numeral 50 represents the white portion of an eyeball, 51 represents a pupil portion, and 52a and 52b represent a pair of cornea reflection images by IRED. The cornea reflection image is called "Purkinje image" (hereinafter referred to a P-image). The two maximum points of the signal 60 in FIG. 5B correspond to a pair of P-images.

In FIG. 6, the X-coordinates of the centers of the cornea reflection images (P-images) d and e correspond to the X-coordinate X0 of the curvature center of cornea 16. Hence provided that the X-coordinates of the positions d and e at which cornea reflection images are generated are $x_d$ and $x_e$, respectively, the standard distance ranging from the curvature center O of the cornea 16 to the center C of the pupil 19 is Loc, and the coefficient for taking a personal difference into the distance Loc into account is A1, the rotational angle $\Theta$ of the optical axis ax2 of an eyeball is held by the following expression:

$$(A1 \times L_{oc}) \times \sin \Theta \equiv x_c - (x_d + x_e)/2 \qquad (1)$$

Hence in the visual axis operation processor, the rotational angle $\Theta$ of the optical axis ax2 of an eyeball can be calculated by detecting each characteristic point (each of cornea reflection images d and e and the position of the pupil center C) projected on a part of the image sensor. The expression (1) is transformed as follows:

$$\beta(A1 \times L_{oc}) \times \sin \Theta \equiv x_c' - (x_d' + x_e')/2 \qquad (2)$$

where $\beta$ is a magnifying power determined by the position of the eyeball to the light receiving lens 12, or obtained as a function of the distance $|x_d' - x_e'|$ of the cornea reflection image. The rotational angle $\Theta$ of the eyeball 15 is rewritten substantially as follows:

$$\Theta \equiv ARCSIN\{(x_c' - x_f')/\beta/(A1 * L_{oc})\} \qquad (3)$$

where $$x_f' \equiv (x_d' + x_e')/2$$

Since the optical axis ax2 of the eyeball of a photographer's does not agree with the visual axis, the rotational angle $\Theta$ in the horizontal direction of the optical axis ax2 of the eyeball of the photographer is calculated, whereby the photographer's horizontal visual axis $\Theta H$ is obtained by performing a degree compensation $\delta$ between the visual axis and the optical axis of an eyeball. When the coefficient which takes into account a personal difference in the compensation degree $\delta$ to the optical axis ax2 and the visual axis of the eyeball is defined by B1, the photographer's horizontal visual axis $\Theta H$ is held by the following expression:

$$\Theta H \equiv \Theta \pm (B1 * \delta) \qquad (4)$$

As for the sign ±, if a clockwise rotational angle with respect to the photographer is positive, the sign + is selected when a photographer's left eye views the observation apparatus, and the sign − is selected when the photographer's right eye views the observation apparatus.

FIG. 6 shows an example that a photographer's eyeball rotates on the Z-X plane (for example, a horizontal plane). Similarly, the detection can be made even when the photographer's eyeball rotates on the Z-Y plane (for example, a vertical plane). However, since the vertical component of the photographer's visual axis agrees with the vertical component $\Theta'$ of the optical axis of the eyeball, the visual axis $\Theta V$ of the photographer in the vertical direction is as follows:

$$\Theta V = \Theta'$$

Moreover the visual axis data $\Theta H$, and the position $(X_n, Y_n)$ on the focusing plate within the visual field where a photographer views at $\Theta V$ are expressed as follows:

$$X_n \equiv m \times \Theta H$$

$$\equiv m \times [ARCSIN\{(x_c' - x_f')/\beta/(A1 \times L_{oc})\} \pm (B1 \times \delta)]$$

$$Y_n \equiv m \times \Theta V$$

where m is a constant determined by the viewfinder optical system of a camera.

The coefficients A1 and B1 which compensate the personal difference in the eyeballs of a photographer can be obtained in such a manner that a photographer gazes at an index arranged at a predetermined position within a camera viewfinder and then the position of the index is aligned with the gazing point calculated based on the expression (5).

According to the present example, a software for a microcomputer in the visual axis arithmetic processor calculates the visual axis and the gazing point of the photographer, based on the expressions described above.

With the personal visual axis difference compensating coefficient calculated, a position of the photographer's visual axis on the focusing plate viewed through the camera's viewfinder is calculated by using the expression (5). The resultant visual axis information is utilized to subject the photographing lens to a focus adjustment and an exposure control and the like.

In order to actually calculate a visual axis, the eyeball image on the image sensor is processed by means of a microcomputer or the like to detect both the above P-image and the pupil circle. As a result, the visual axis is calculated based on the positional information.

Japanese patent laid-open Application No. 4-347131 etc. discloses a concrete method. According to the conventional art, the photoelectric conversion signals from all the pixels of an image sensor are read to subject them to an A/D conversion. Then the coordinates of the P-image and the pupil circle are memorized through a sequential process. In a brief explanation, the coordinate of the P image is calculated when it is recognized that pixel luminance level of an image exceeds a predetermined value. The pupil circle is extracted by using the luminance difference at the boundary between a pupil and an iris. At this time, the sequential process judges from the minimum luminance value whether the coordinate is suitable as the edge point. Hence when a sequential process has completed reading all the pixels, it is judged again from the minimum luminance value in all pixels whether the coordinate is suitable as the edge point or not. The circle is presumed from the remaining edge points by applying a least-squares method to the edge coordinates with the minimum luminance value. This presumed circle is defined by a pupil circle.

FIG. 7A shows an eyeball image (but the P-image is omitted here). The plural white circles around the pupil portion 51 represent the pupil edges. Numeral 70-1 represents one of the pupil edges. FIG. 7B shows only extracted pupil edges in FIG. 7A.

The circle 75 is presumed by subjecting the edge data to the least-squares method. The presumed circle with the radius $r_c$ of the center coordinate $(x_c, y_c)$ is shown in FIG. 7C. When the above visual axis detector is used to detect an observer's visual axis viewing a camera viewfinder, it is indispensable to give the observer's viewing way a degree of freedom. That is, it is desirable that the visual axis can be accurately detected even if the viewing position is changed somewhat. Hence the image receiving area of the image sensor must be wide. However, this large area requires an increased number of pixels and a large amount of processing operation to read a visual axis detection signal and to extract the pupil edge and the P-image, thus requiring much operational time.

The storage capacity of the internal RAM in a microcomputer used for the camera control is not generally so large that the entire image information in the area sensor can be stored at one time. Therefore, while image data for several lines are being stored into the RAM, the characteristic point extraction is performed through the sequential process during which a reading is performed line by line. As described above, waste time is required because the sequential process is executed to update the lowest luminance value and each edge point must be re-judged after the sequential process has been completed to all the pixels.

When the pupil portion is detected, the noise component such as ghost and flare entering from a detecting optical system, and an image reflected from glasses worn by a viewer may be mixed with the small output signal of the pupil edge portion. Hence there is a problem that the pupil edge detection may be erroneously performed, thus degrading the reliability of the pupil circle detection.

To cope with the above problem, Japanese patent laid-open Application No. 4-240438 proposes that all the pixels are read in and the edge nearest to the output pixel coordinate of a minimum luminance signal is recognized as a pupil edge. However, this method requires that all the pixels are once read in to perform a sequential process, whereby the reliability in detection can be improved but the visual axis detection speed rate cannot be shortened.

SUMMARY OF THE INVENTION

In order to overcome the above mentioned various problems, the first object of the present invention is to provide a signal processor which can provide an improved detection speed for detecting an observer's gazing point.

The second object of the present invention is to provide a signal processor which can detect a gazing point with improved accuracy in addition to higher detection speed.

According to the present invention, in the visual axis detector, which has plural photoelectric conversion elements and an area sensor for receiving an eyeball image, for executing a signal process of a photoelectric conversion signal output from the area sensor to detect a visual axis, an area in the area sensor is set or a photoelectric conversion element to be processed is selected, based on a signal indicating a character point of the eyeball image among the output signals from the plural photoelectric conversion elements; and a signal process is performed based on the output signal from the selected photoelectric conversion element to detect the visual axis.

Especially, the characteristic point according to the present invention is the output of the photoelectric conversion element showing, for example, a Purkinje image or a pupil center.

The signal process for the visual axis detection is actually performed by subjecting sequentially the signal outputs from performing an operation process to calculate the positions of a pupil edge and a Purkinje image based on the converted signal.

These and other objects of the present invention will become apparent from the following drawings and detailed description taken in connection with the drawings.

BRIEF DESCRIPTION OF THE DRAWINGS

FIG. 4 is a sequence used for explaining the operation of the area sensor according to the present invention;

DETAILED DESCRIPTION OF THE PREFERRED EMBODIMENTS

Figure 1:
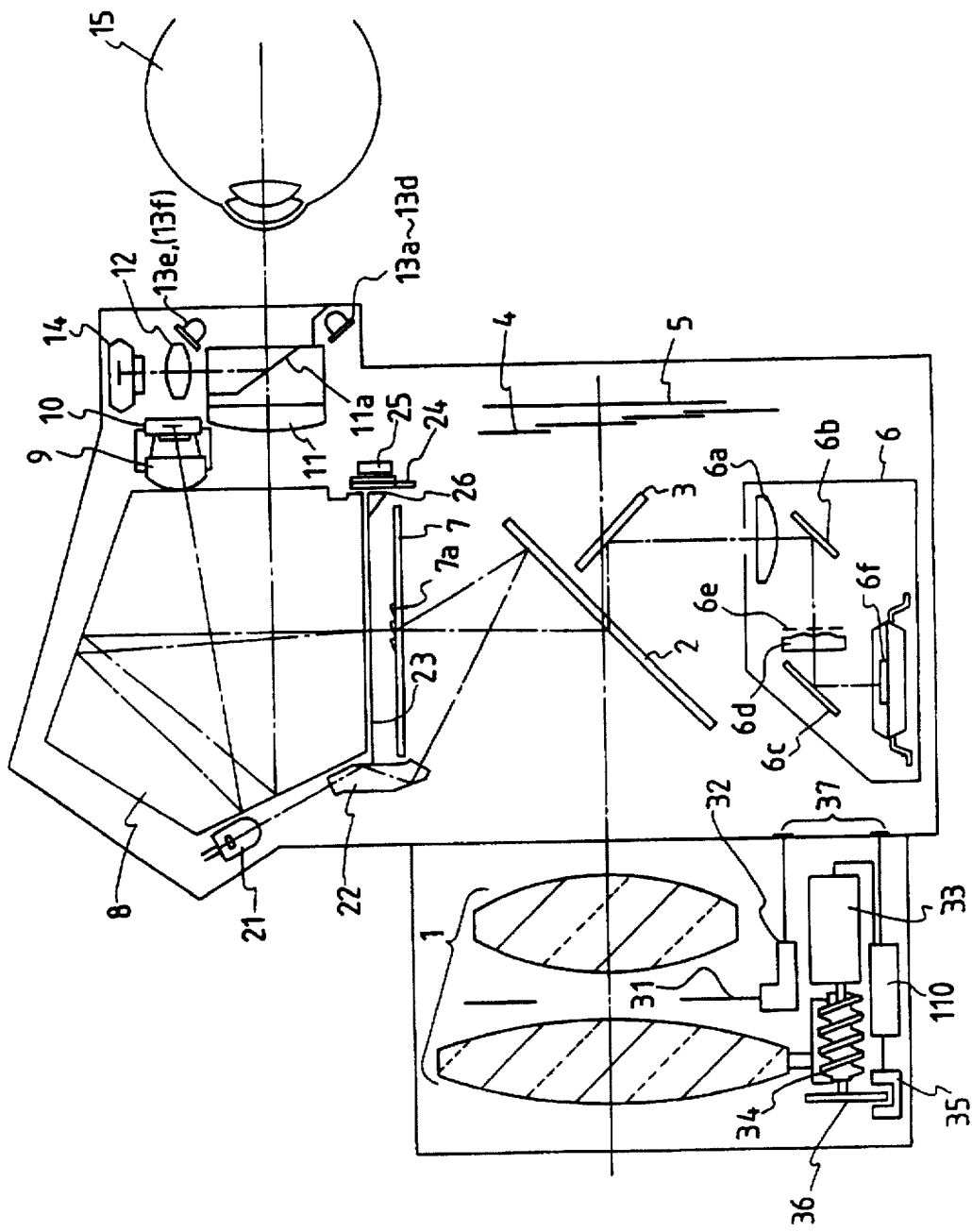
FIG. 1 is a cross-sectional view showing a visual axis detector according to the present invention applied to a single-lens reflex camera.

FIG. 1 is a cross-sectional view showing the detector according to the present invention applied to a single-lens reflex camera.

Referring to FIG. 1, a photographing lens 1 is formed of two lenses for convenience (but actually a more large number of lenses). A primary mirror 2 is arranged obliquely to or withdrawn out of the photographing optical path in accordance with the observation state and the photographing state of a camera object image in the viewfinder system. A sub-mirror 3 reflects a luminous flux passing through the primary mirror 2 toward the focus detection device 6 (to be described later) at the lower portion of the camera body.

Numeral 4 represents a shutter 4. Numeral 5 represents a photosensitive member formed of a silver-salt film, a CCD or MOS-type solid-state image element, or a camera pick-up tube such as vidicon.

A focus detecting device 6 is formed of a field lens 6a arranged near to the image forming plane, reflection mirrors 6b and 6c, a secondary image forming lens 6d, an aperture 6e, and a line sensor 6f including plural CCDs.

The focus detecting device 6 according to the present invention employs a well-known phase-difference system.

Numeral 7 represents a focusing plate arranged on a predetermined image forming plane of the photographing lens 1, numeral 8 represents a pentagonal prism for varying a viewfinder optical path, 9 represents an image forming lens for measuring a camera object luminance within an observation image plane, and 10 represents a photometry sensor for measuring a camera object luminance within an observation image plane. The image forming lens 9 has a conjugate relationship between the focusing plate 7 and the photometry sensor 10 via the reflection optical path within the pentagonal prism 8.

An eyepiece 11 with a light splitter 11a is arranged behind the light outgoing surface of the pentagonal roof prism 8 to observe the focusing plate 7 viewed by a photographer's eye 15. The light splitter 11a, for example, is formed of a dichroic mirror which passes visible rays but reflects infrared rays.

Numeral 12 represents a light receiving lens. Numeral 14 represents an image sensor where a photoelectric conversion element array are two-dimensionally arranged. The detail circuit configuration of the two elements will be described later. The image sensor 14 is arranged so as to be conjugate with the pupil portion near to the photographer's eye 15 at a predetermined position to the light receiving lens 12. Numerals 13a to 13f represent an infrared light emitting diode acting as a illumination light source, respectively.

Numeral 21 represents a superimposing LED with high intensity which is visible for a bright camera object. The emitted light enters the primary mirror 2 via an illuminating prism 22. The light is reflected by the primary mirror 2 and then is deflected by means of a microprism array 7a arranged on the display surface of the focusing plate in a perpendicular direction to the light entering direction. Then the light reaches the photographer's eye 15 via the pentagonal prism 8 and the eyepiece 11.

The microprism array 7a disposed in a frame shape is arranged at plural positions (distance measuring points) corresponding to the focus detecting area of the focusing plate 7 to illuminate with five superimposing LEDs (LED-L1, LED-L2, LED-C, LED-R1, and LED-R2) 21 corresponding to the plural positions.

Numeral 23 represents a visual field mask for forming a viewfinder visual area. Numeral 24 represents an LCD within a viewfinder for displaying photographing information out of the viewfinder visual field. The LCD is illuminated with an illuminating LED (F-LED) 25.

A triangle prism 26 guides the light passed through the LCD 24 into the viewfinder visual field to display it outside the viewfinder visual field, whereby a photographer can grasp photographing information.

Numeral 31 is an aperture arranged within the photographing lens 1, 32 represents an aperture drive mechanism including an aperture drive circuit 111, 33 represents a lens drive motor, 34 represents a lens drive member formed of a drive gear or the like, and 35 represents a photo coupler. The photo coupler detects the rotation of the pulse plate 36 cooperating with the lens drive member 34 to transmit to the lens focus adjusting circuit 110. The lens focus adjusting circuit 110 drives the lens drive motor by a predetermined amount based on both the above information and information regarding lens drive amount from the camera side to make the photographing lens 1 move to a focus position. Numeral 37 represents a mount contact for an interface between a well-known camera and a lens.

Figure 2:
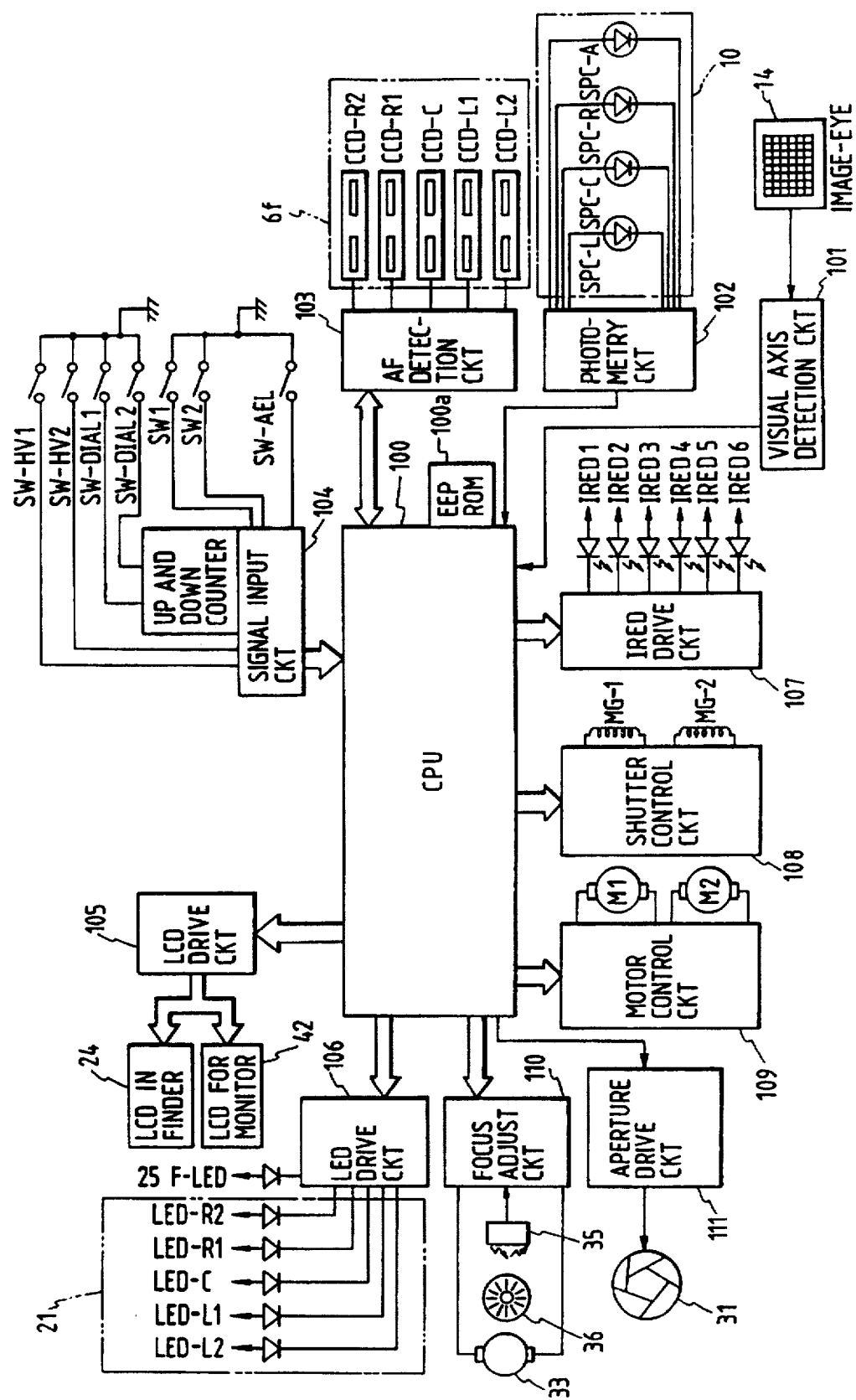
FIG. 2 is an electrical circuit block diagram used for the camera in FIG. 1.

FIG. 2 is an explanatory diagram of an electrical circuit built in a camera. In FIGS. 1 and 2, the same elements have the same numerals.

To the central processor unit (CPU) 100 in the microcomputer built in a camera body are connected a visual axis detection circuit 101, a photometry circuit 102, an automatic focus detection circuit 103, a signal input circuit 104, an LCD drive circuit 105, an LED drive circuit 106, an IRED drive circuit 107, a shutter control circuit 108, and a motor control circuit 109. A signal is transmitted to the focus adjusting circuit 110 and the aperture drive circuit 11a arranged in the photographing lens via the mounting contact (shown in FIG. 1).

The EEPROM 100a associated with the CPU 100 includes a visual axis compensating memory function for compensating a personal difference of a visual axis.

The visual axis detection circuit 101 converts the output of the eyeball image from the image sensor (IMAGE-EYE) 14 to an A/D conversion and then transmits the image information to the CPU 100. The CPU 100 extracts each characteristic point (to be described later) of an eyeball image necessary for a visual axis detection in accordance with a predetermined algorithm (to be described later), and calculates a photographer's visual axis based on the position of each characteristic point.

The photometry circuit 102 subjects the output from the photometric sensor 10 to an amplification, a logarithmic compression, and an A/D conversion, and then sends the resultant outcome as luminance information of each sensor to the CPU 100. The photometric sensor 10 is constituted by SPC-L, SPC-C, SPC-R and SPC-A which employ photometry for four areas. Line sensor 6f in FIG. 2 is a well-known CCD line sensor which is constituted by CCD-L2, CCD-L1, CCD-C, CCD-R1 and CCD-R2 corresponding to the five distance measuring points within the image screen.

The automatic focus detecting circuit 103 subjects the voltage obtained from the line sensors 6f to an A/D conversion to send the resultant outcome to the CPU 100. The switch SW-1 is turned on by the first stroke of the release button 41 to start a photometric operation, an AF operation, and a visual axis detection operation and the like. The switch SW-2 is turned on by the second stroke of the release button. The AE lock switch SW-AEL is turned on by depressing the AE lock button 43. The SW-DIAL1 and SW-DIAL2 are input to the up/down counter into the signal input circuit 104 with a dial switch arranged within an electronic dial (not shown) to count a rotational click amount of the electronic dial.

The attitude detection switches SW-HV1 and SW-HV2, which are formed of mercury switches, detect whether a camera is arranged at a horizontal position or a vertical position.

Numeral 105 represents a well-known LCD drive circuit for displaying and driving a liquid crystal display element LCD. The LCD drive circuit 105 can display simultaneously an iris aperture value, shutter second, a set photographing mode, and the like to both the monitoring LCD 42 and the LCD 24 in the viewfinder, in accordance with a signal from the CPU 100. The LED drive circuit 106 performs a lighting control and a flashing control of the illumination LED (F-LED) 25 and the superimposing LED 21. The IRED drive circuit 107 lights selectively the infrared light emitting diode (IREDs 1 to 6) 13a to 13f in accordance with circumstances.

The shutter control circuit 108 controls a magnet MG-1 for running the front curtain and a magnet MG-2 for running the back curtain at an energizing time to expose a predetermined light amount to the photosensitive member. The motor control circuit 109 winds up a roll of film and controls a winding-up motor M1 and a rewinding motor M2 for charging the primary mirror 2 and the shutter 4. A series of a camera release sequence is operated by using the shutter control circuit 108 and the motor control circuit 109.

Figure 3:
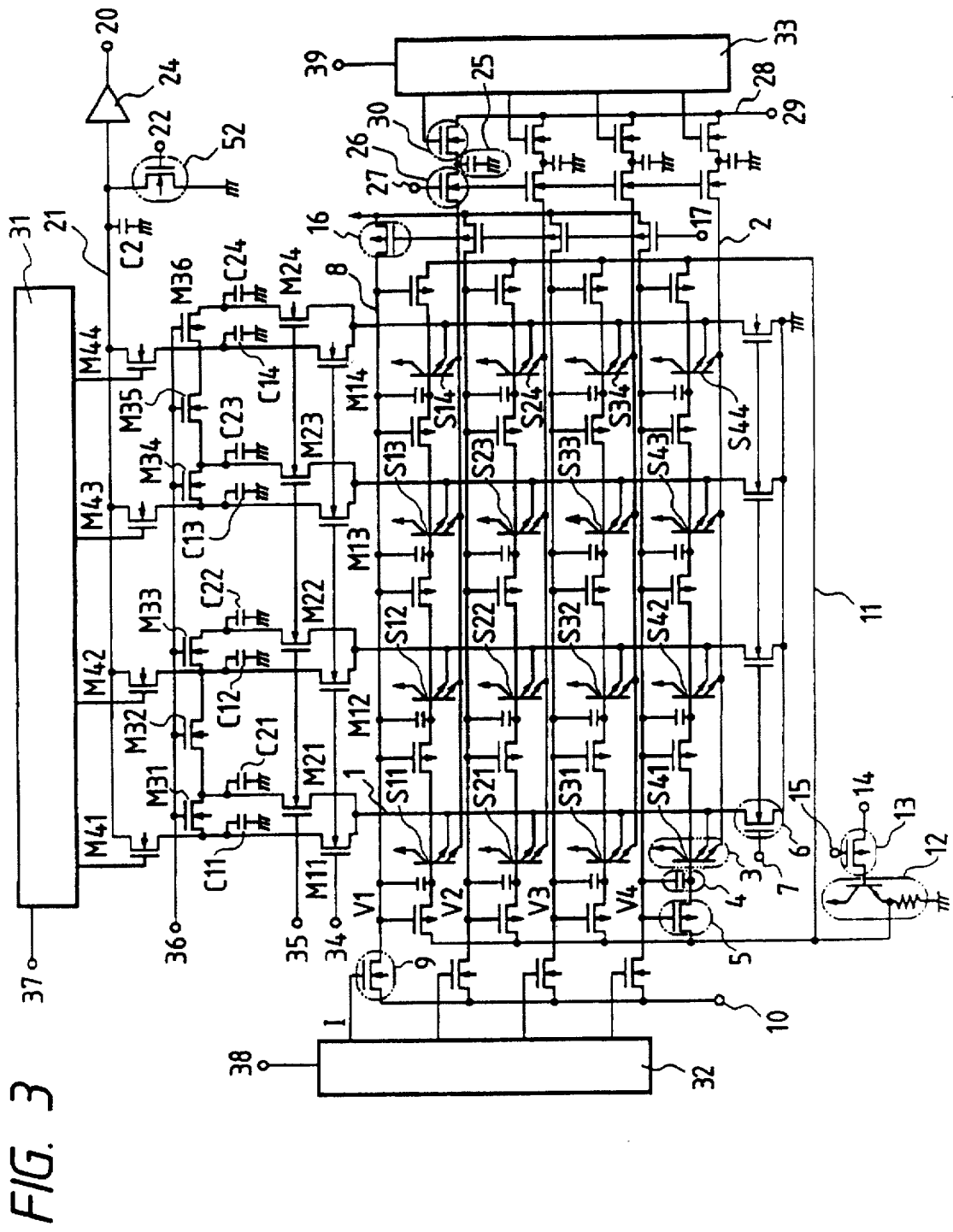
FIG. 3 is a circuit diagram for an area sensor with 4×4 pixels' state according to the present invention.

FIGS. 3 and 4 is a circuit diagram used for explaining of the image sensor (IMAGE-EYE) 14 in FIG. 2.

The image sensor 14, in actual, has a total number of about 15000 (=150×100) pixels: horizontal pixels of 150 and vertical pixels of 100. In FIGS. 3 and 4, for convenience of a simplified explanation, the area sensor has 16 (=4×4) pixels.

The image sensor 14 is controlled by the CPU 100 via the visual axis detection circuit 101. The image sensor 14 also has pixel reset function, photoelectric accumulating function, and accumulation signal output function. Moreover the image sensor 14 has a function outputting a peak value per horizontal line and a peak value per vertical line preceding an image signal output to perform an actual visual axis detection, and a function outputting an average block signal with 25 (=5 horizontal pixels×5 vertical pixels) pixels. In FIGS. 3 and 4, for a simple explanation, the block signal is an average block signal of 4 (=2×2) pixels.

An embodiment will be explained below, in which each output signal from the photoelectric conversion elements is subjected to an A/D conversion; a photoelectric output (P-image or pupil portion) indicating characteristic points of an eyeball is specified before a signal process procedure is performed to detect a visual axis; and an area within an image sensor is set to perform an actual signal process, whereby the visual axis is detected based on the output of all the photoelectric conversion elements within the specified area.

The circuit and operation of the image sensor 14 will be explained with reference to FIGS. 3 and 4. According to the present embodiment, an explanation will be made as for the example that both the P-image and the pupil portion are detected.

A photoelectric conversion element 3 is formed of a bipolar transistor having the double emitters wherein the base accumulates photo electric charge. The first emitter is connected to the output line 1 and the second emitter is connected to the output line 2. Numeral 4 represents a capacitor for controlling the base potential of the bipolar transistor 3, numeral 5 represents a P-type MOS transistor to reset the base of the bipolar transistor 4, numeral 6 represents a MOS transistor for grounding the vertical output lines 1, numeral 7 represents a terminal for applying pulses to the gate of the MOS transistor 6, numeral 8 represents a horizontal drive line to control the base potential of the bipolar transistor 3 via the capacitor 4 and to perform an image resetting and reading, numeral 9 represents a buffer MOS transistor for turning on when the output of the vertical shift register I is applied to the gate, numeral 10 represents a terminal for applying pixel's drive pulse thereto, numeral 11 represents a wiring for connecting the drains of P-MOS transistors 5 on the right side with P-MOS transistors on the left side, numeral 12 represents an emitter follower having the output connected to the wiring 11, numeral 13 represents a MOS transistor for controlling the base potential of the emitter follower 12, numeral 14 represents a power source terminal connected to the drain terminal of the MOS transistor 13, numeral 15 represents a terminal for applying pulses to the gate of the MOS transistor 13, numeral 16 represents a P-type MOS transistor having a drain fixed at a positive potential; and numeral 17 represents a terminal for applying pulses to the gate of the P-MOS transistor 16. C11, C21, . . . , C14, and C24 represent a capacitor for accumulating pixel output potentials output via the vertical output line 1, respectively. M11, M21, . . . , M14, and M24 represent MOS transistors which switch the output lines 1 to the capacitors C11, C21, . . . , C14, and C24, respectively. M11, M21, . . . , M14, and M24 are terminals for applying pulses to the gates of MOS transistors, respectively. Numeral 21 represents a horizontal output line. C2 represents a parasitic capacitance associated with horizontal output lines 21. M41, . . . , and M44 represent switching MOS transistors conducting capacitors C11, C21, . . . , C14, and C24 to the horizontal output line 21 when they are selected in response to the horizontal shift register output. Numeral 52 represents a MOS transistor for grounding the horizontal output line 21, numeral 22 represents a terminal for applying pulses to the gate of the MOS terminal 21, numeral 24 represents an amplifier for receiving the potential of the output line 21, numeral 20 represents its output, numeral 25 represents a capacitor for accumulating the pixel output potential output via the output line 2, numeral 26 represents a MOS transistor for switching to the output line 2 or the capacitor 25, numeral 27 represents a terminal for applying pulses to the gate of the MOS transistor 26, numeral 28 represents an output line for conducting the potential of the capacitor 25, numeral 29 represents an output terminal for the output line 28, and numeral 30 represents a switching MOS transistor selected in response to the output of the vertical shift register II to conduct sequentially the capacitor 25 and the output line 28. Numeral 32 represents a vertical shift register I, and numeral 38 represents a capacitor for applying pulses for driving the shift register I. Numeral 33 represents a vertical shift register II and numeral 39 represents a terminal for applying pulses to drive a horizontal shift register II. Numeral 39 represents a capacitor for applying pulses for driving the vertical shift register II. Numeral 31 represents a horizontal shift register, and numeral 37 represents a terminal for applying pulses for driving the horizontal shift register 37. M31, . . . , and M36 represent MOS transistors connected in a block form to the capacitors C11, C21, . . . , C41, and C42. Numeral 36 represents a terminal for applying pulses to the gate the MOS transistor 36.

Next an explanation will be made as for the operation of the sensor with reference to the pulse timing chart shown in FIG. 4. Referring to FIG. 4, sensor drive pulses $\phi$VC, $\phi$R, $\phi$P, $\phi$RC, $\phi T_1$, $\phi T_2$, $\phi$HC, $\phi$VT, $\phi$BK, $\phi$H, $\phi$V1, and $\phi$V2 are inputted to the pulse input terminals 7, 10, 15, 17, 34, 35, 22, 27, 36, 37, 38, and 39, respectively. V1, V2, V3, and V4 are the first pixel line selection signal, the second pixel line selection signal, the third pixel line selection signal, and the fourth pixel line selection signal, respectively. The AD & process 1 means that the visual axis detection circuit 101 subjects the output signal 20 to an A/D conversion and the CPU execute a process to be described later. The AD & process 2 means that the visual axis detection circuit 101 subjects the output signal 29 to an A/D conversion and the CPU 100 execute a process to be described later.

[Base Clamp]

First, it is assumed that the pulse $\phi$P (15) is in a low level and the emitter follower 12 outputs a positive output voltage. At this time, since the gate of the P-MOS transistor 5 is connected to the drive line 8 in a low level, the P-MOS transistor is turned on. Thus the base potential of each of the bipolar transistors 3 corresponding to all pixels comes to equal to the output potential of the emitter follower 12.

[Sequential Reset]

After the pulse $\phi$P (15) at a low level makes the output of the emitter follower 12 to be GND (ground), the pulse $\phi$VC (7) at a high level makes the vertical output line 1 to be ground. Thus the bipolar transistor 3 flows an emitter current through its first emitter, thus decreasing its base potential. The vertical shift register I32 is activated by a drive pulse $\phi$V1. The pulse $\phi$R (10) is added to the horizontal drive line 8 every lines. The high level of the drive line 8 once boosts the base potential of each of the corresponding pixels via the capacitance coupling of the capacitor 4. However the emitter current flowing again through the first emitter decreases the base potential. When the potential of the horizontal drive line 8 falls to a low level, the capacitance coupling swings negatively the base potential, whereby a reverse bias state occurs between the first emitter and the base.

[Accumulation]

At the time of the reverse bias state, the electric charges produced due to an incident light are accumulated in the base of each pixel, whereby the base potential is increased in accordance with an accumulation electric charge amount.

[H-Line Peak Read-out]

Next, when the pulse $\phi$RC (17) is at a low level, the P-MOS transistor 16 is turned on, thus increasing the horizontal drive line potential to a high level. Then the base potential of each pixel is boosted by the capacitance coupling to make a reverse bias state between the emitter and the base so that the maximum pixel output value in each line appears on the output line 2. Then the output line potential is accumulated into each storage capacitance 25 through the MOS transistor 27. Next, the vertical shift register II33 is activated in response to the pulse $\phi$V2 (39) to output sequentially from the potential of the capacitor 25 to the output terminal 29. The CPU 100 uses the signal to control the accumulation time.

[V-Line Peak Read-out]

With the pulse $\phi$VC at a low level, the vertical output line 1 becomes electrically a floating state. With the pulse $\phi$RC (17) at a low level, the P-MOS transistor 16 is turned on while the horizontal drive line potential is at a high level. Then when the capacitance coupling boosts the base potential of each pixel, a forward bias state is made between the emitter and the base so that the maximum output pixel output value appears on the output line 1. The output line potential is accumulated into the storage capacitances C11, C12, C13, and C14 through the MOS transistors M11, M12, M13, and M14, respectively. Next, the horizontal shift register 31 is activated by the pulse φH, the potentials of the capacitors C11 to C14 is divided with the capacitance C2 and then the amplifier 24 outputs the divided potential to the output terminal 20. This signal is processed by the CPU 100 to use the area limitation (to be described later).

[Block Read-out]

Potential of the vertical output line 1 is grounded in response to the pulse φVC (7), and thereafter becomes electrically a floating state. While the vertical shift register I is driven by the pulse φV1 (38), the pulse V1 is applied to the first line of the drive lines 8 by applying the pulse φR (10). The output potential of each pixel ($S_{11}$ to $S_{14}$) is on the output line 1. The output potential is respectively accumulated to each of the capacitors C11, C12, C13, and C14 in response to the pulse $φT_1$ (34).

Next, in order to repeat the above operation, the pulse φV1 (38) applies the output of the vertical shift register I to the next line. The pulse $φT_2$ (35) instead of the pulse φT1 (34) accumulates the output potential of each pixel ($S_{21}$ to $S_{24}$) associated with the second line into the capacitances C21, C22, C23, and C24.

When the pulse φBK (36) is applied, MOS transistors M31, . . . , and M36 are turned on to average the capacitors C11, C21, C12, and C22. This process allows the output signals of blocked pixels S11, S12, S21, and S22 to be averaged to the capacitors C11, C21, C12, and C22, respectively.

On the other hand, the output signals of the blocked pixels S13, S14, S23, and S24 are averaged to capacitors C13, C14, C23, and C24, respectively. The horizontal shift register, which is driven by the pulse φH (37), sequentially transfers the averaged block signal to the horizontal output line 21, thus outputting it from the output terminal 20 via the amplifier 24. When the block signal corresponding to the potential of the capacitor C11 is received, the CPU 100 executes a predetermined process (A/D conversion or reading). Since the block signal corresponding to the potential of the capacitance C12 is the same as that corresponding to the capacitance C11, the CPU 100 does not execute an A/D conversion and the process. In the similar manner, the block signal corresponding to the capacitance C13 is subjected to an A/D conversion. But the signal corresponding to the capacitor C14 is not subjected to the A/D conversion and process.

Moreover, the vertical shift register I changes its output to repeat the above operation. The pixels associated with the third line are accumulated to the capacitors C11, C12, C13, and C14, respectively, and the pixels associated with the fourth line are accumulated to the capacitors C21, C22, C23, and C24, respectively. With the pulse φBK (36), the signals for the pixels S31, S32, S41, and S42 are averaged to the capacitors C11, C12, C21, and C22. The signals for pixels S33, S34, S43, and S44 are averaged to the capacitors C13, C14, C23, and C24. The horizontal shift register is driven to output the block signal so that the above process is repeated.

[Main Reading (the First Line Reading to the Fourth Line Reading)]

Hereinafter a main reading operation is performed to detect a visual axis. In this case, an A/D conversion and process are not applied similarly to all the pixels. However, an area is limited by the peak reading and the block reading described above, and then an A/D conversion is performed only to the limited area. According to the present embodiment, an explanation will be limited to the second column line, the third column line, the second row line, and the third row line.

Since the first column line is out of the limited area, the vertical shift register is moved but the signal is not output. In the manner similar to the block reading, the pixel signals are accumulated into the capacitors C11, C12, C13, and C14 associated with the second column line, respectively. The horizontal shift register outputs the signal from the output terminal 20. The CPU 100 subjects the signals of the second row line (S22) and the third row line (S23) to an A/D conversion and a predetermined process, but does not perform to the first row line (S21) and the fourth row line to an A/D conversion (S24).

Like the second column line, the CPU 100 also processes to the third column line, but does not process to the first column line.

As described above, in the signal process to the image sensor 14 (IMAGE-EYE) according to the present invention, an H-Line peak read-out, a V-Line peak read-out, and the block read-out can be performed before the main reading operation. The position of a P-image, the position of a pupil circle, and the level thereof are previously approximately calculated to subject the pixel signals in only a limited area among all the pixels to an A/D conversion and process.

Next, an explanation will be made as for a flow for detecting a gazing point with reference to FIG. 8. If the CPU 100 starts a visual axis detecting operation, data in the step (#001) is initialized via the step (#000).

The variable EDGCNT is directed to a variable which counts the number of extracted the boundary between an iris The pupil as an edge.

The variables IP1, IP2, JP1, and JP2 are a variable for showing the position of each cornea reflection image (hereinafter referred to a Purkinje image or P-image) of the light emitting diodes 13a and 13b, respectively. Two P-images lie in the area of an eyeball reflection image surrounded by the horizontal (x-axis) ranges IP1 to IP2 and the vertical (Y-axis) range JP1 to JP2.

It is now assumed that the number of pixels in the area sensor 14 is assumpted for size of 150 pixels in the horizontal direction×100 pixels in the vertical direction. The just center position (75, 50) of the area IP1, IP2, JP1, and JP2 is stored as an initial value. The flow goes to the following step (#002).

In the step (#002), suitably selected combination from among the infrared-ray emitting diodes (IRED) 13a to 13f are illuminated. The attitude switches SW-HV1 and SW-HV2 perform the IRED selection by judging whether the camera lies in a horizontal or vertical position, the photographer wears glasses. Then the IMAGE-EYE 14 performs the base clamp and the sequential resetting to start the accumulation into the image sensor 14.

In the step (#003), the horizontal line (H-Line) peak reading is performed during the accumulation. In the step (#004), if the maximum value of the horizontal line peak is not at a predetermined level, a loop from the step (#003) to the step (#004) is repeated until the horizontal line peak reaches the predetermined value. This process controls the accumulation time to read out always a suitable pixel image signal.

When a predetermined electric charge accumulation is terminated, the IRED is turned off in the following step (#005). The peak reading of the vertical line (V-Line) is performed in the following step (#006).

Figure 11:
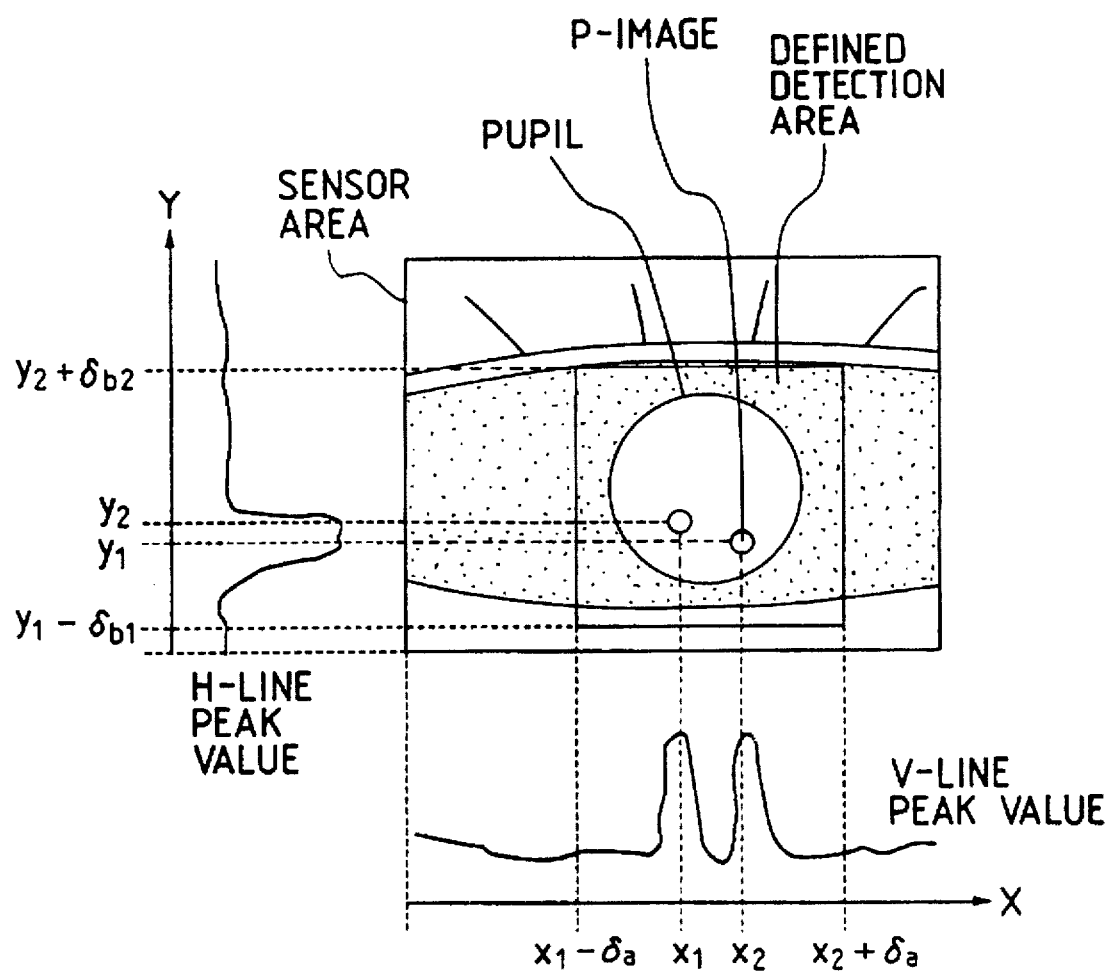
FIG. 11 is an explanatory diagram for setting an area (limited detection area) in the area sensor according to the present invention.

In the step (#007), a maximum point (P-image candidate point) is extracted from the peak value of the horizontal line and the peak value of the vertical line. FIG. 11 diagramatically shows the extraction process. When an eyeball image is viewed within the area center, as shown in FIG. 11, it is determined that the maximum points of the H-Line peak value are decided as the coordinates y1 and y2 and the maximum values of the V-Line peak value are decided as the coordinates x1 and x2.

In the step (#008), the limited area is determined based on the maximum points. That is, if the condition is given by the following expressions:

$$JL1 \leftarrow y_1 - \delta_{b1}$$

$$JL1 \leftarrow y_2 + \delta_{b2}$$

$$IL1 \leftarrow x_1 - \delta_a$$

$$IL2 \leftarrow x_2 + \delta_a,$$

It is determined that the area is on the coordinate IL1 to IL2 on the X-axis (horizontal direction) and on the coordinate JL1 to JL2 on the Y-axis (vertical direction). $\delta_a$, $\delta_{b1}$, and $\delta_{b2}$ are respectively a value determined the presumed maximum area within which the pupil circle can exist by the position of the P-image. FIG. 11 shows the limited area as a limited detection area. From the step (#009), the area sensor starts the main reading and sequential processing.

The step (#009) is the so-called "loop process" which executes a process in the frame while the loop variable J is being counted up from 0 to 99.

In the step (#010), as described for the first and second lines with reference to FIGS. 3 and 4, if the Y-coordinate is not between JL1 and JL2, the vertical shift register I increments to count up J, thus advancing to the next line.

Figure 18:
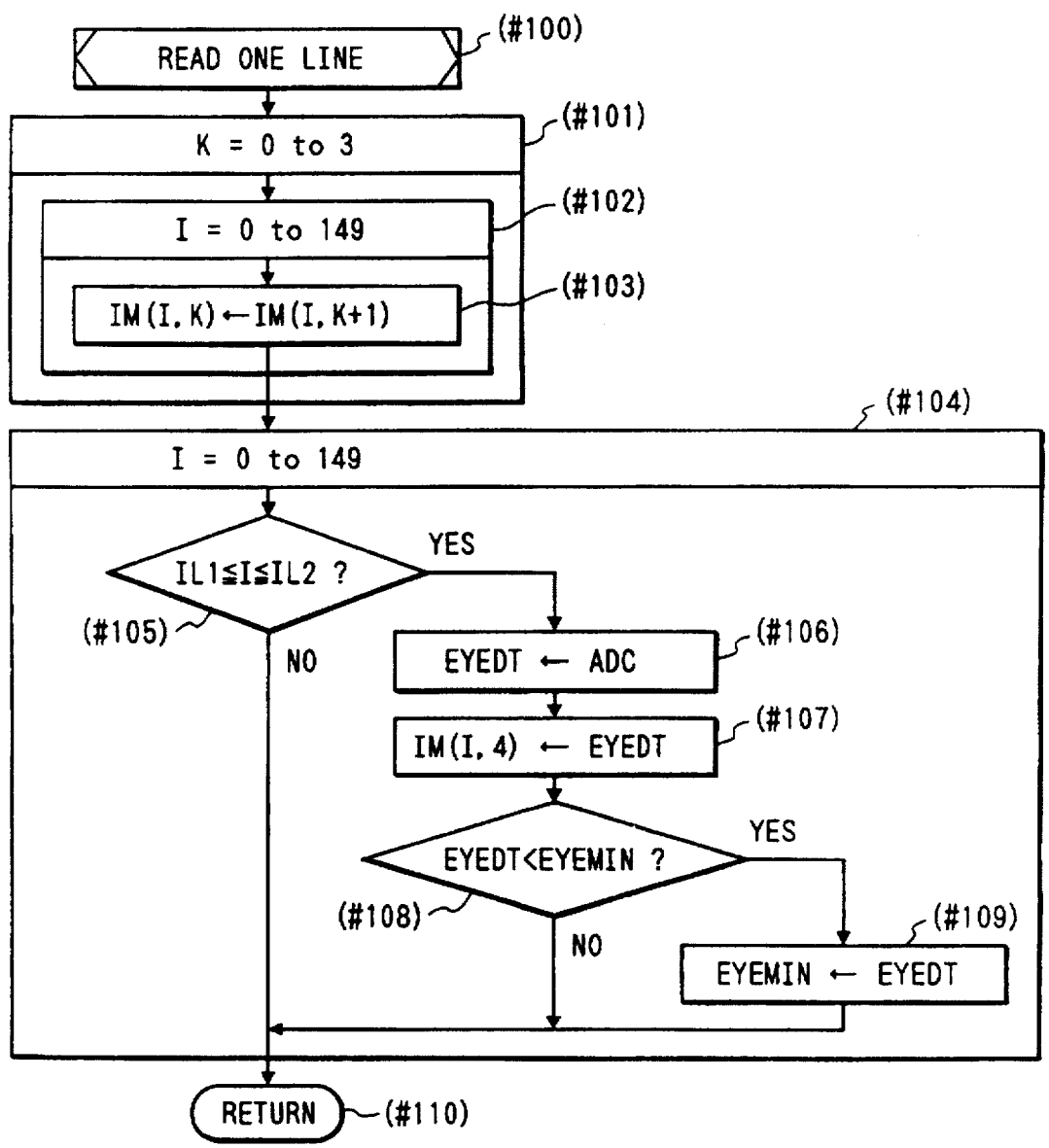
FIG. 18 is a flowchart for performing a visual axis detection according to the present invention, particularly one line reading operation.

If the Y-coordinate is between JL1 and JL2, the flow goes to the step (#011) to read the photoelectric conversion signal for one horizontal (X-axis) line of the area sensor. This one line reading is performed in a subroutine mode. FIG. 18 shows the flowchart for "one-line reading" in the subroutine.

When the subroutine is called for "one-line reading", the flow goes to the next step (#101) via the step (#100) shown in FIG. 18. The step (#101) and the step (#102) in the frame represent the loop process similar to that in the step (#006). While the variable K counts up till from 0 to 3 in the step (#101) and the variable I counts up till from 1 to 149 in the step (#102), the process in each frame is performed. Therefore the step (#101) and the step (#102) represent the so-called nesting loop process in which the variables K and I are nested.

In the step (#103) in the loop process in the step (#102), an array variable IM (i, k) is re-stored.

According to the present embodiment, the CPU 100 executes a signal process. However, the RAM (random access memory) built in a microcomputer generally has a memory capacity which is not so large as all pixel information of the area sensor are stored at a time. In the present embodiment, the image signals output from the area sensor are sequentially read in while the internal RAM in the microcomputer stores only update image information corresponding to the five horizontal direction (X-axis) lines, whereby a visual axis detection is performed at one-line reading intervals.

The double loop process ranging from the step (#101) to the step (#103) updates the image signal data stored for the past five lines to read an image signal for a new one line. That is, of array variables IM (i, k), IM (i, 0) [i=0 to 149] represents the oldest one-line image data and IM (i, 4) [i=0 to 149] represents the latest one-line image data. In order to store new one-line image data into IM (i, 4) [i=0 to 149], data is updated as follows:

$$IM(i, 0) \leftarrow IM(i, 1)$$

$$IM(i, 1) \leftarrow IM(i, 2)$$

$$IM(i, 2) \leftarrow IM(i, 3)$$

$$IM(i, 3) \leftarrow IM(i, 4) \ [i=0 \text{ to } 149]$$

In the steps (#101) to (#103), when the loop process has been completed to update data, the loop process in the following step (#104) is performed.

In the loop process in the step (#104), while an image signal for one line (150 pixels) in the horizontal direction (X-axis) of the area sensor are being outputted, an A/D conversion is being performed only to the limited area. The resultant information is stored into the RAM. Further the minimum value of the image signal is detected.

In the step (#105), when the variable I (X-axis) is not within IL1 to IL2, the variable I is stepped up to go to the next row line, without performing an A/D conversion or process, like the first and fourth row lines to the second column line shown in FIGS. 3 and 4.

When the variable I lies within IL1 to IL2, the flow goes to the step (#106). The CPU 100 stores temporarily the A/D converted ADC value of the image signal into the EYEDT.

In the next step (#106), the EYEDT value is stored into the array variable IM (i, 4). The variable I is counted up till from 0 to 149 in the external loop process step (#104).

The minimum value of the image signal is detected in the steps (#107) and (#108). The EYEMIN variable is a variable which holds the minimum value of an image signal. In the step (#107), if EYEMIN variable is smaller than EYEDT variable , the flow is branched at the step (#108) so that EYEMIN variable is updated to the EYEDT value.

In the steps (#104) to (#109), when the loop process has been completed while an image signal storage for a new one line and a minimum value detection have been completed, the subroutine, "one-line reading", is returned in the step (#110).

Figure 8B:
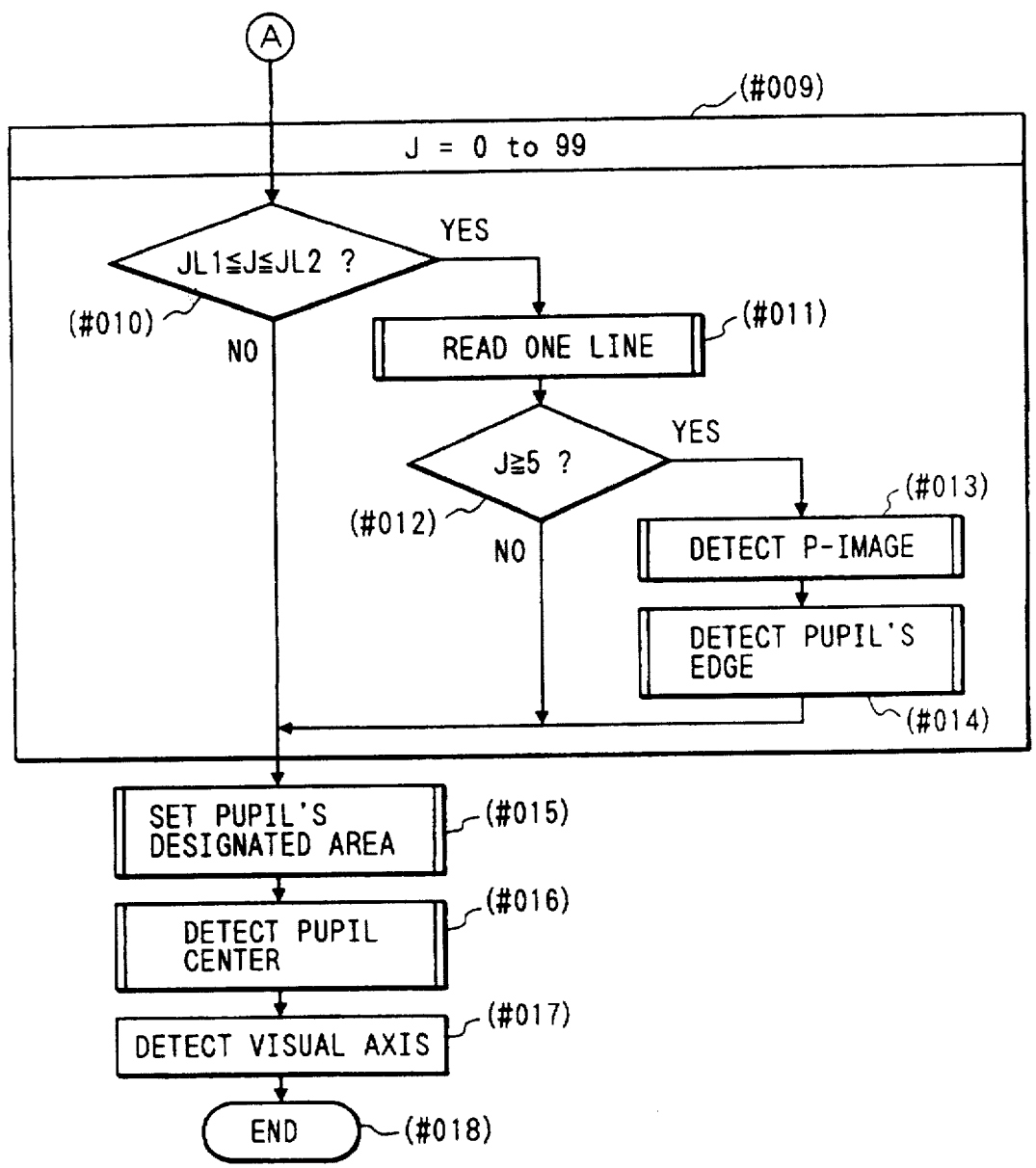
FIG. 8 is comprised of FIGS. 8A and 8B showing flowcharts for the visual axis detection according to the present invention.

By returning to the flowcharts in FIGS. 8A and 8B, when the subroutine, "one-line reading", has been completed in the step (#011), the flow goes to the step (#012) to examine whether the loop variable J in the external loop process step (#009) is over 5.

The loop variable J represents a pixel line in the vertical direction (X-axis) of the area sensor. In the present embodiment, since the number of the pixels of the area sensor is (150×100), the variable J is counted up till from 0 to 99.

When the loop variable J in the step (#012) is over 5, the flow is branched at the step (#013). The reason is why if the number of lines for image signals read is over 5, the area sensor can be processed in the vertical direction (Y-axis).

Figure 19:
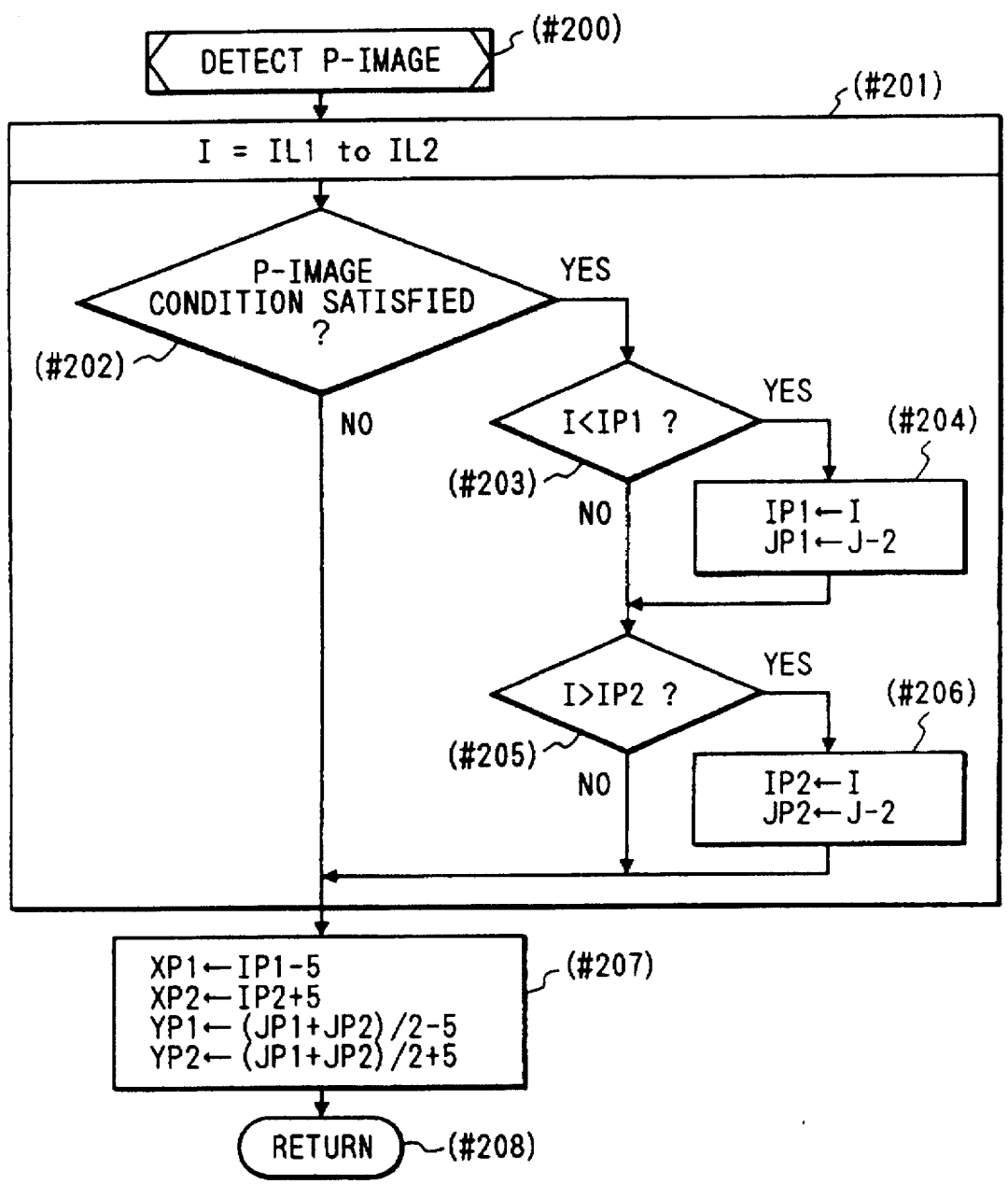
FIG. 19 is a flowchart for performing a visual axis detection according to the present invention, particularly a P-image detection operation.

A subroutine, "P-image detection", is performed in the branched step (#013). The subroutine, "P-image detection", detects the position of the cornea reflection image (P-image) described above every time when one-line reading is performed in the horizontal direction (X-axis) of the area sensor. The flowchart is shown in FIG. 19.

When the subroutine, "P-image detection", is called, the loop process in the step (#201) is performed via the step (#200).

This means that the loop process is performed within the limited area IL1 to IL2. In the loop process, the position of the P-image is detected in the image data (stored in the array variable IM (i, k)). If the position of the P-image is found, the position on the area sensor is memorized. In the present embodiment, since two P-images occur, two pieces of positional information are memorized.

In the first step (#202) in the loop, it is judged whether the image data at a predetermined position satisfies the condition as P-image. The "P-image condition" in the step (#202) is as follows:

$IM(I, 2) > C1$ and $IM(I, 1) > C2$ and $IM(I, 3) > C2$ and $IM(I-1, 2) > C2$ and $IM(I+1, 2) > C2$ where C1 and C2 are threshold values, and C1≧C2. The values C1 and C2 are obtained from EYEMAX (the maximum value in the peak value) obtained through the horizontal line peak value reading or the vertical line peak value reading. For example, C1=EYEMAX−20 and C2=EYEMAX−50. It is assumed that these values are subjected to 8-bit processing by A/D conversion to have 0 to 255.

As described above, the threshold value is determined based on the value EYEMAX. The present embodiment is not a method that accumulation is ceased when EYEMAX becomes a constant value. However, in a method that controls an accumulation at a constant time, since the EYEMAX may not become constant, the P-image detection can be always performed with good reliability by calculating C1 and C2 using the above expressions.

Figure 5A:
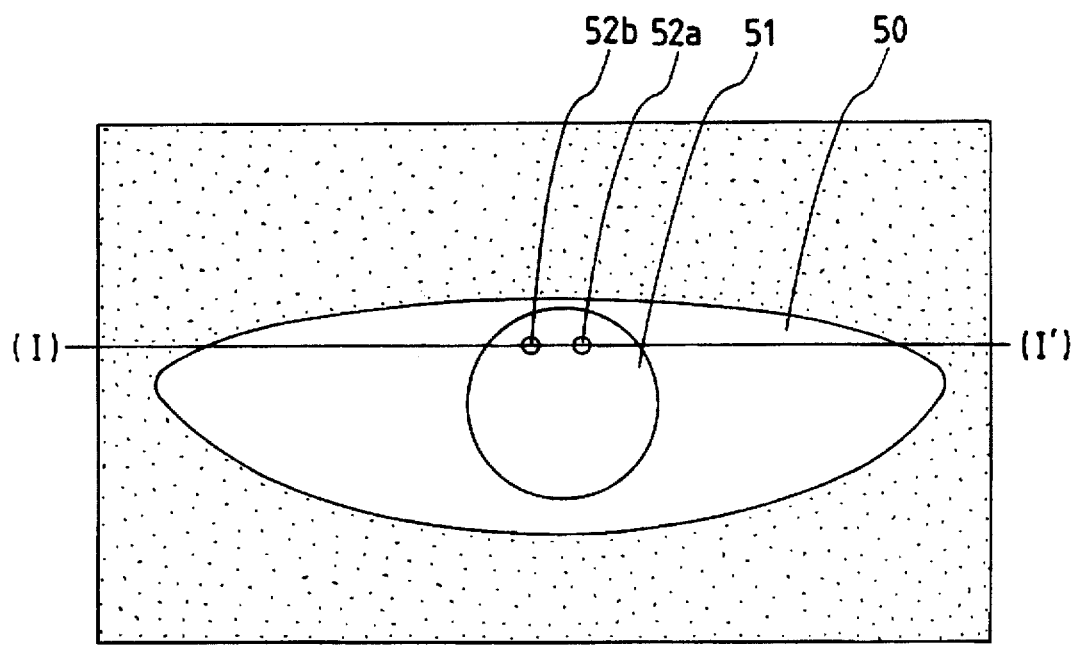
FIG. 5A is a diagram showing an eyeball image on an area sensor.
Figure 5B:
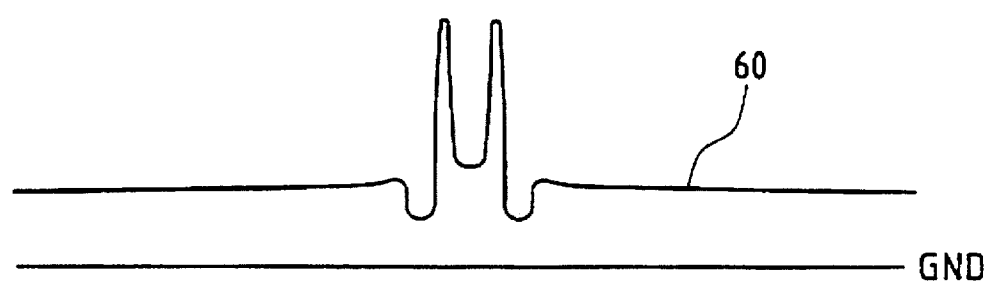
FIG. 5B is a diagram showing an eyeball image on an area sensor.
Figure 6:
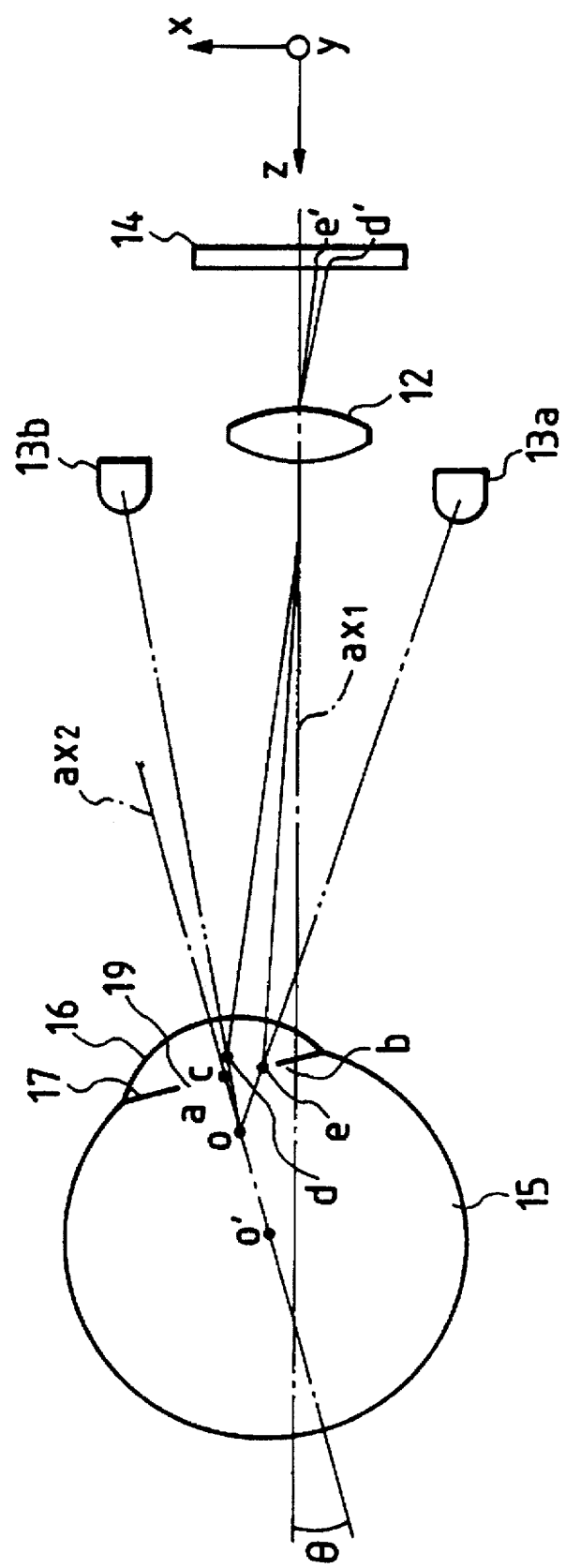
FIG. 6 is a diagram used for explaining the principle of a visual axis detection.
Figure 7A:
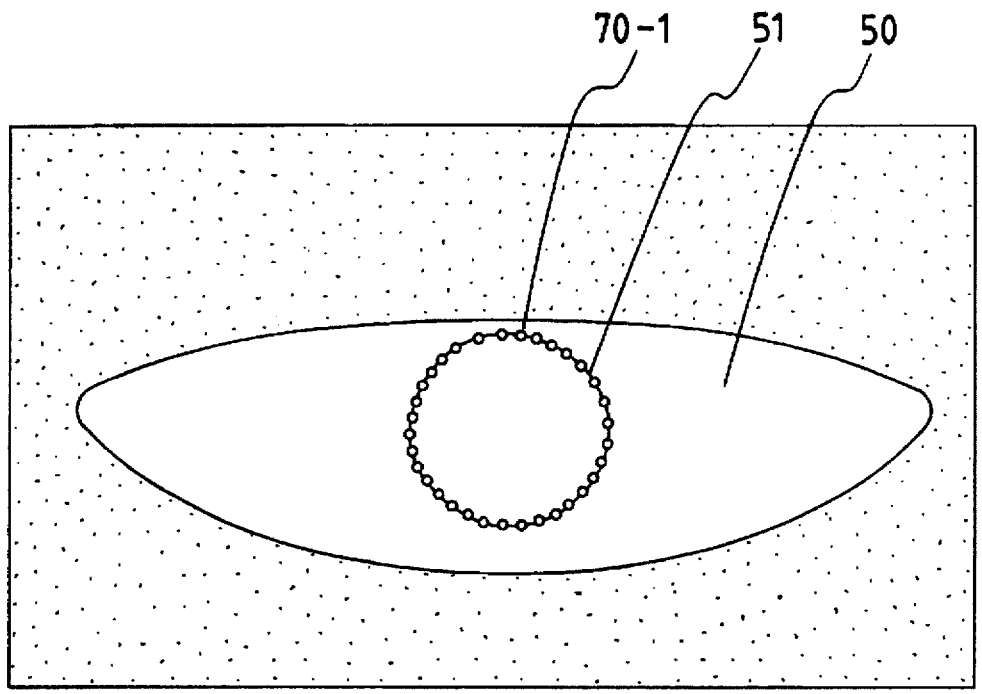
FIG. 7A is a diagram used for explaining a pupil circle detection.
Figure 7B:
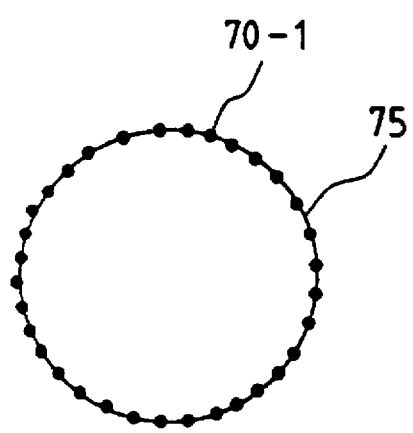
FIG. 7B is a diagram used for explaining a pupil circle detection.
Figure 7C:
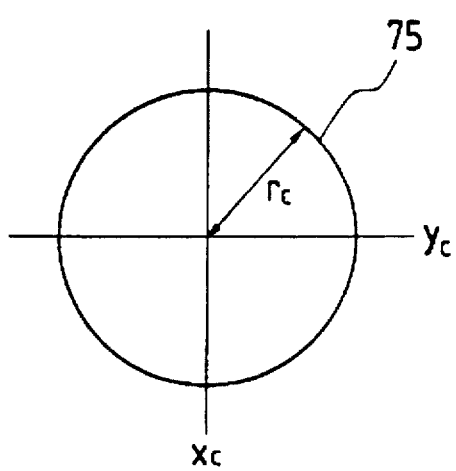
FIG. 7C is a diagram used for explaining a pupil circle detection.

The above condition is defined two-directionally (vertical/horizontal directions (X/Y axes) by noting that as if the P-image were like a spot image, as described with FIGS. 5A and 5B). Satisfying the condition regards as that the P-image is at the position (I, 2).

As described above, the array variable IM (i, k) is updated at every time when one-line in the horizontal (X-axis) direction on an area sensor is read. The position J line in the vertical (Y-axis) direction is stored in the IM (i, 4) [i=0 to 149]. Hence the address (i, 2) to the variable IM (I, M) is the position (I, J−2) on the area sensor.

In the step (#202), when there is data which satisfies the condition of the P-image, the flow is branched to the step (#203). When there is no image data, the external loop variable I is counted up.

From the step (#203), a process is performed to determine two P-image existence region (a region in the X-axis direction [IP1 to IP2] and a region in the Y-axis direction [JP1 to JP2]).

First, in the step (#203), the variable in the horizontal direction, I representing the position of the area sensor is compared with the variable, IP1. If I<IP1, the flow is branched to the step (#204). That is, when the variable I is horizontally positioned more left than the P-image position IP1 (on the left side), IP1 is rewritten.

In the step (#204), the variable I is stored in the variable IP1, and the vertical position (J−2) is stored in the variable JP1.

In the steps (#205) and (#206), it is judged to update the horizontal position IP2 on the right side and the vertical position JP2 in the P-image existence area.

As described above, in the loop process in the step (#201), when one-line process has been completed from 0 to 149 on the horizontal (X-axis) position I, the flow goes to the following step (#207).

In the step (#207), the variables XP1, XP2, YP1, and YP2 (to be referred in the following process) are calculated in accordance with the expression shown in figure.

Figure 23:
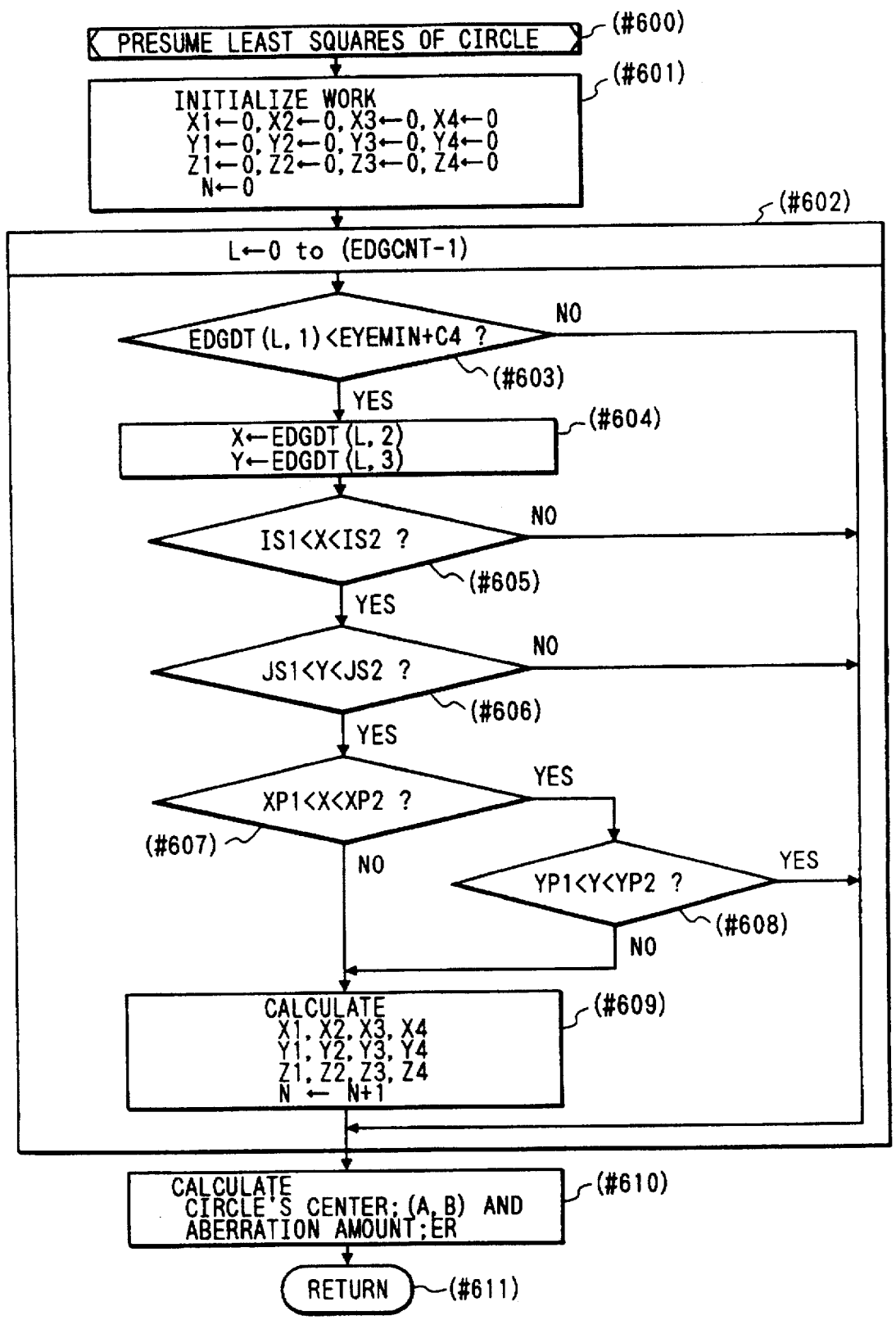
FIG. 23 is a flowchart for selecting a suitable point to calculate a pupil circle based on plural points of a detected pupil edge.

The meaning of the variables will be explained in detail with reference to FIG. 23. In a brief explanation, the variables are used to remove eyeball edge information produced near to the P-image when the eyeball center is detected.

When the process in the step (#207) is finished, the subroutine, "P-image detection", is returned in the following step (#208).

Let us return again the flowchart shown in FIG. 8. When the subroutine, "P-image detection", in the step (#013) has been completed, the subroutine, "pupil edge detection", is performed in the step (#014).

Figure 20:
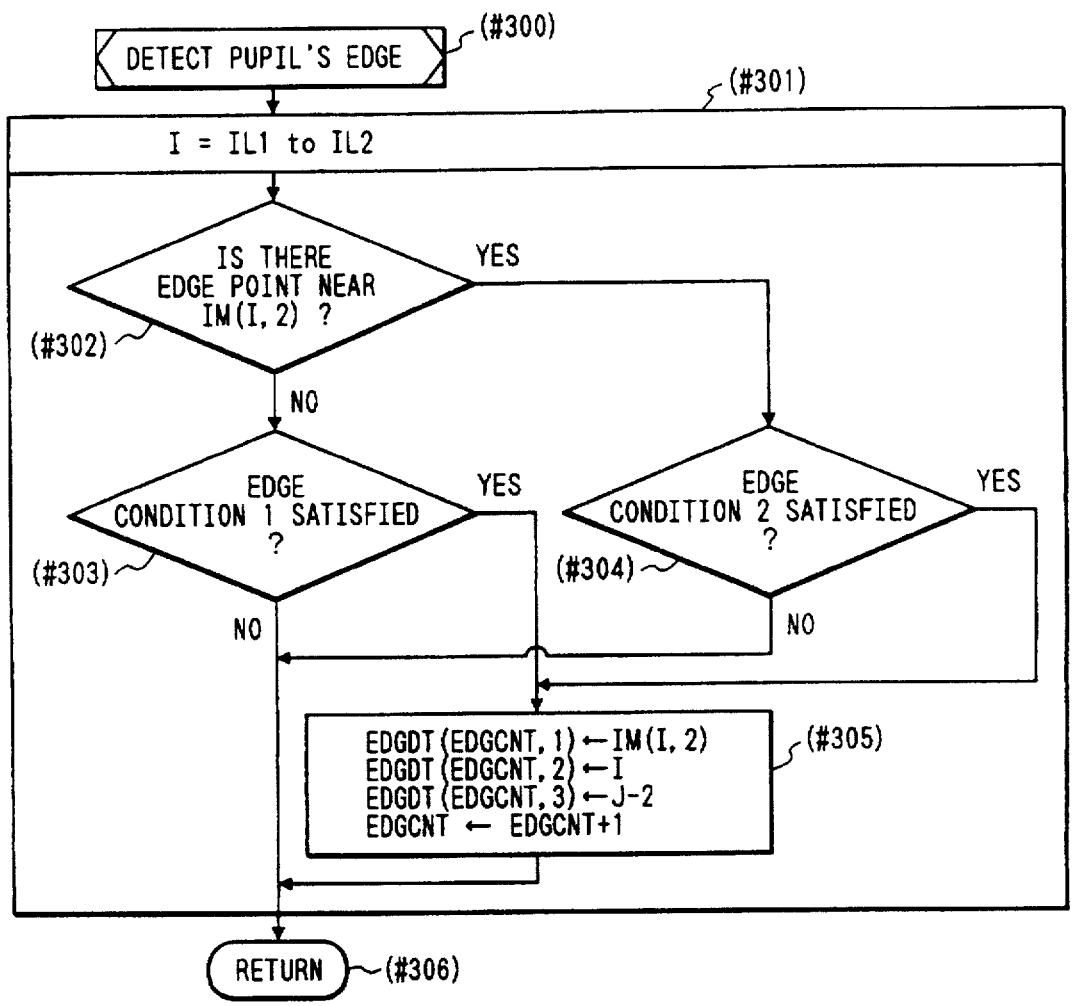
FIG. 20 is a flowchart for performing a visual axis detection according to the present invention, particularly a pupil edge detection operation.

The "pupil edge detection" is a subroutine which detects the position of the pupil edge (the boundary between an iris and a pupil) in the eyeball reflection image. FIG. 20 shows the flowchart for the above subroutine.

When the subroutine, "pupil edge detection", is called, a loop process is performed in the following step (#301) via the step (#300). Like the step (#201) shown in FIG. 19, the step (#301) includes a loop process using as a loop variable a variable I representing the position in the horizontal (X-axis) direction on the area sensor. This loop process is a loop applied to only the limited area IL1 to IL2, like the P-image detection.

The loop process in the step (#301) detects whether there is a character point representing the edge of a pupil among image data. If there is the characteristic point, the position information is memorized. The pupil aperture edge position information is stored to the array variable EDGDT (m, n).

The data format of the array variable EDGDT (m, n) is set as follows:

EDGDT (m, 1) . . . Luminance at the m-th edge point

EDGDT (m, 2) . . . X-axis coordinate at the m-th edge point

EDGDT (m, 3) . . . Y-axis coordinate at the m-th edge point where m is the order of an edge point found in a pupil edge detection sequential process. Therefore, when M edges are detected, the array variable EDGDT with a capacity of [M×3] is needed.

In the first step (#302) in the loop, it is judged whether there is a past detected edge point near to the image data IM (I, 2). Further the detail explanation will be made as follows:

The loop variable I in an external loop process represents the position in the horizontal direction (X-axis) of the area sensor. The address (I, 2) to the array variable IM (i, k) storing image data is the point (pixel coordinate) to be Just checked on whether the point is the pupil edge. Whether a point adjacent to the point (I, 2) has been Judged as a pupil edge on the past sequential process is examined based on the array variable EDGDT (m, n) storing edge position information.

The judging condition in the step (#302) is described in concrete as follows:

$\{EDGDT(m, 2), EDGDT(m, 3)\} = \{(I-1), (J-2)\}$
or $= \{(I-1), (J-3)\}$
or $= \{(I), (J-3)\}$
or $= \{(I+1), (J-3)\}$
The $\{EDGDT(m, 2), EDGDT(m, 3)\}$ exists herein.

where relationship of m=0 to (EDGCNT−1) is satisfied.

Since the coordinate to be currently detected is {(I), (J−1)}, the above coordinate represents the next position on the left side, the next position on the left and upper side, the next position on the upper side, and the next position on the right and upper in order to the current coordinate.

EDGDT (m, 2) represents the X-axis coordinate at the m-th edge, and EDGDT (m, 3) represents the Y-axis coordinate at the m-th edge. After all, the above mentioned condition judges whether there has been an edge point at the next position on the left side, the next position on the left and upper side, the next position on the upper side, and the next position on the right and upper.

In the step (#302), when it is judged that there is an edge point near to the coordinate (I, J–2), the flow goes to the step (#304). When it is judged that there is no edge point near to the coordinate (I, J–2), the flow is branched to the step (#303) and a pupil edge is judged under a respectively different condition.

Next an explanation will be made as for the case that there are no near edge points.

In the step (#303), it is judged whether image data on the coordinate (I, J–2) to be currently detected satisfies the judging condition of the pupil edge, (referred to "edge condition 1"). It should note that the image data of the coordinate (I, J–2) is stored to the array variable (I, 2). The judging condition is as follows:

1. $\{IM(I-1, 2) - IM(I, 2)\} > C3$ and $\{IM(I-2, 2) - IM(I-1, 2)\} < C3$ and $IM(I, 2) < a$ 2. $\{IM(I+1, 2) - IM(I, 2)\} > C3$ and $\{IM(I+2, 2) - IM(I+1, 2)\} > C3$ and $IM(I, 2) < a$ 3. $\{IM(I, 1) - IM(I, 2)\} > C3$ and $\{IM(I, 0) - IM(I, 1)\} > C3$ and $IM(I, 2) < a$ 4. $\{IM(I, 3) - IM(I, 2)\} > C3$ and $\{IM(I, 4) - IM(I, 3)\} > C3$ and $IM(I, 2) < a$ If the above items 1 to 4 are satisfied, the coordinate (I, J–2) is regarded as an edge point. In this case, a=EYEMIN+ C4, where EYEMIN is the minimum luminance value among image data obtained in the current sequential process. C4 is a constant determined by EYEMAX and EYEMIN.

$$C4=(EYEMAX-EYEMIN) \times C5$$

The constant is needed to determine the pupil edge condition with good reliability. It is convenient in the case where there is plenty of external light, or a signal has a small dynamic range (EYEMAX-EYEMIN) or a large dynamic range. For example, C3=3 and C5=1/10.

The above condition is characterized that there is continuously a predetermined luminance difference at the pupil edge (the boundary between an iris and a pupil) while the pupil portion has the lowest luminance in the eyeball reflection image. The conditions 1 and 2 extract the edge in the horizontal direction (X-axis) on the area sensor. The conditions 3 and 4 extract the edge in the vertical direction (Y-axis) on the area sensor.

When the coordinate (I, J–2) is extracted as a pupil edge, the flow is branched from the step (#303) to the step (#305), whereby the luminance value and the coordinate at the edge point are memorized.

In the step (#305), the following information are stored in the array variable EDGDT (m, k) for the edge position information storage.

EDGDT (EDGCNT, 1)←$IM(I, 2)$

EDGDT (EDGCNT, 2)←$I$

EDGDT (EDGCNT, 3)←$J-2$ where IM (I, 2) is a luminance at an edge point detected the EDGCNT-th, I is X-coordinate, and (J–2) is Y-coordinate.

One variable EDGCNT which counts the number of detected edge points is counted up.

When the step (#305) has been completed, the loop variable I in an external loop process (representing the horizontal direction and the X-axis coordinate) is counted up and the flowchart is again executed after the step (#302).

Explanation will be made below as for the case where the step (#302) judges that there is an edge near to the current coordinate (I, J–2).

In this case, the flow is branched to the step (#304). Like the step (#303), it is judged whether the image data at the coordinate (I, J–2) to be currently checked satisfies the condition of the pupil edge. Hereinafter the judge condition in the step #304 is defined as "edge condition 2".

The "edge condition 2" is set to be more generous than the "edge condition 1". According to the present embodiment, the threshold values C3, C4, and C5 are changed to the threshold values C3', C4', and C5' in the following conditional formula.

$$C3'=2, C4'=(EYEMAX-EYEMIN) \times C5', C5'=0.15$$

The above setting increases the ratio at which the coordinate is judged as an edge, in comparison with the edge condition 1.

The reason why two kinds of edge conditions are prepared is that if a point is judged as an edge, the possibility would be high that the neighboring points near the point may be also edge points because essentially, edge points are not isolated but arranged continuously.

When a point is judged as an edge point under the "edge condition 2" in the step (#304), the flow is branched to the step (#305) to memorize the coordinate information.

As described above, the loop process in the step (#301) is repeated till the loop variable I becomes IL2. When the process for performing a one-line edge detection in the horizontal direction (X-axis) on the area sensor, the flow goes to the step (#306) so that the subroutine, "pupil edge detection", is returned.

The explanation will be directed again to FIGS. 8A and 8B. When the subroutine, "pupil edge detection", has been completed in the step (#014), the loop variable J (representing the vertical direction, or the Y-axis coordinate, of the area sensor) in an external loop process step (#009) is counted up so that the process following the step (#010) is executed till the variable J becomes 99.

If the loop variable J becomes 99, the reading and process of all pixels of the area sensor is completed, then the flow goes from the step (#009) to the step (#015).

In the steps (#015) to (#017), the pupil center coordinate and the visual axis are detected based on the P-image position and the pupil edge information detected through the loop process in the step (#009). First, in the step (#015), the subroutine, "pupil presumption area setting", is called.

The plural pupil edge points detected by the subroutine, "pupil edge detection", in the step (#014) includes false edge points generated due to various noises, in addition to plural pupil edge point representing an actual pupil circle (a circle defined by the boundary between an iris and a pupil).

Figure 21:
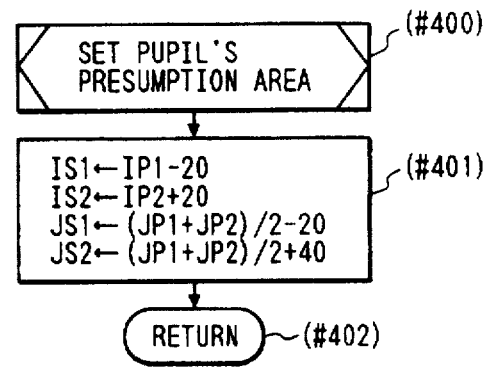
FIG. 21 is a flowchart for performing a visual axis detection according to the present invention, particularly a pupil presumption area.

The "pupil presumption area setting" is a subroutine which defines the coordinate range of a possible edge point based on the P-image position information to remove a false edge. The flowchart is shown in FIG. 21.

When the subroutine, "pupil presumption area setting", is called, the step (#401) is executed after the step (#400).

In the step (#401), using the P-image position range previously explained with the subroutine, "P-image detection", that is, information of horizontal (X-axis) IP1 to IP2 and the vertical (Y-axis) JP1 to JP2, the coordinate ranges IS1, IS2, JS1, and JS2 of a pupil circle are calculated according to the following expressions:

$$IS1 \leftarrow IP1-20$$

$$IS2 \leftarrow IP2+20$$

$$JS1 \leftarrow (JP1+JP2)/2-20$$

$$JS2 \leftarrow (JP1+JP2)/2+40$$

The possible pupil edge point is defined as a point which exists within the horizontal (X-axis) range IS1 to IS2 and the vertical direction (Y-axis) range JS1 to JS2 in the area sensor.

In the optical system according to the present invention, as shown in FIG. 5A, two P-images are always on the upper portion of the pupil circle. This holds the above expressions.

After the calculation has been completed in the step (#401), the flow goes to the step (#402) to return the subroutine, "pupil presumption area setting".

Returning to FIGS. 8A and 8B, the subroutine, "pupil aperture center detection", in the step (#016) is called.

The "pupil aperture center detection" is a subroutine which presumes the shape of a pupil circle (the center coordinate and size) from the coordinate of a possible pupil edge point. The flowchart is shown in FIGS. 22 and 24A to 24D.

The shape of the pupil circle is presumed using the least-squares method. This concept will be explained in advance. The formula of a circle with the center coordinate (a, b) and the radius of c is as follows:

$$(x-a)^2+(y-b)^2=c^2 \qquad (10)$$

Now let us consider that a, b, and c are determined to minimize the error amount ER of the following expression in terms of plural observation points (x1, y1), (x2, y2), . . . , and (xn, yn):

$$ER=\Sigma[(xi-a)^2+(yi-b)^2-c^2]^2 \qquad (11)$$

ER, a square sum of each observation point and a distance (error) in the direction of a normal line of a circle determined by a, b, and c, is minimized. ER equals to 0 and is partially differentiated with respect to a, b, and c.

$$\delta ER/\delta a = \Sigma[-4(xi-a)^3-4(xi-a)(yi-b)^2+4c^2(xi-a)]=0 \qquad (12)$$

$$\delta ER/\delta b = \Sigma[-4(yi-b)^3-4(xi-a)^2(yi-b)+4c^2(xi-b)]=0 \qquad (13)$$

$$\delta ER/\delta c = \Sigma[4c^3-4(yi-b)^2c-4c(xi-a)^2]=0 \qquad (14)$$

where i=1 to n.

The expression (14) is transformed as follows:

$$c^2=\Sigma[(xi-a)^2+(yi-b)^2]/n \qquad (15)$$

The expression (15) is substituted for the expressions (13) and (14). Here the expressions are arranged properly as follows:

$$X1=\Sigma\ xi,\ X2=\Sigma\ xi^2,\ X3=\Sigma\ xi^3 \qquad (16) \text{ to } (18)$$

$$Y1=\Sigma\ yi,\ Y2=\Sigma\ yi^2,\ Y3=\Sigma\ yi^3 \qquad (19) \text{ to } (21)$$

$$Z1=\Sigma\ xi\ yi,\ Z2=\Sigma\ xi^2\ yi,\ Z3=\Sigma\ xi\ yi^2 \qquad (22) \text{ to } (24)$$

$$V1=X2-X1^2/n \qquad (25)$$

$$V2=Y2-Y1^2/n \qquad (26)$$

$$W1=X3+Z3 \qquad (27)$$

$$W2=Y3+Z3 \qquad (28)$$

$$W3=(X2+Y2)/n \qquad (29)$$

$$W4=Z1-X1Y1/n \qquad (30)$$

$$W5=(Z1-2\cdot X1Y1/n)\ Z1 \qquad (31)$$

$$W6=X1Y2 \qquad (32)$$

$$W7=X2Y1 \qquad (33)$$

The center coordinate (a, b) of a circle is calculated using following expressions:

$$a=[W1V2-W2W4-(W6-Y1Z1)W3]/[2(X2V2-W5-W6X1/n)] \qquad (34)$$

$$b=[W2V1-W1W4-(W7-X1Z1)W3]/[2(Y2V1-W5-W7Y1/n)] \qquad (35)$$

The radius c (which does not directly relate to the visual axis (a gazing point) calculation) is calculated using the following expression:

$$c=[W3-2(aX1+bY1)/n+a^2+b^2]^{1/2} \qquad (36)$$

According to the present embodiment, the error amount ER, which is used to judge the reliability of a pupil center, is given by the following expression:

$$ER=X4-4aX3+2(2a^2+d)X2-4adX1+Y4-4bY3+2(2b^2+d)Y2-4bdY1+ \\ 2(Z4-2aZ3-2bZ2+4abZ1)+d^2n \qquad (37)$$

where $$X4=\Sigma xi^4 \qquad (38)$$

$$Y4=\Sigma yi^4 \qquad (39)$$

$$Z4=\Sigma xi^2 yi^2 \qquad (40)$$

$$d=a^2+b^2-c^2 \qquad (41)$$

Now explanation will be made below as for the flowchart shown in FIGS. 22 to 24D in accordance with the above numerical calculation.

When the subroutine, "pupil center detection", is called, the subroutine, "the least-squares presumption of circle", in the step (#501) is called via the step (#500 ).

The "least-squares assumption of circle", is a subroutine which calculates the center coordinate (a, b) and an aberration amount ER of a pupil circle in accordance with the above expressions. The flowchart is shown in FIG. 23. The subroutine reexamines the lowest luminance value and removes a false pupil edge due to the P-image.

When the subroutine, "least-squares presumption of circle", is called, the flow goes to the step (#601) via the step (#600).

In the step (#601), the work variable of the least-squares formula is initialized.

The next step (#602) is a loop process in which a variable L is used as a loop variable and calculates the front part of the least-squares method based on the pupil edge information memorized.

(EDGCNT-1) pieces of information are stored as a pupil edge point to the array variable EDGDT. The loop number represents the order that information memorized.

In the first step (#603) in the loop process, the luminance value EDGDT (L, 1) of the L-th edge point compared with (EYEMIN+C4). If the luminance value is larger, the current process for the loop variable L is terminated.

According to the present embodiment, while the photo-electric conversion signal of the area sensor is read, a sequential process is performed. Hence the lowest luminance value used at the edge point detection portion is only a temporary lowest luminance value. The detected edge point is not one Judged with the right lowest luminance value, but insufficient edge points may be actually included. The purpose of the step is to judge again the lowest luminance value based on the finally determined lowest luminance value to remove points insufficient as pupil edges.

When the step (#603) judges that the luminance value is small, the flow goes to the step (#604) to store temporarily the horizontal (X-axis) coordinate and the variable Y on the vertical (Y-axis) coordinate in the variables X and Y, respectively.

In the next step (#605), it is judged whether the horizontal (X-axis) coordinate X of the L-th edge point is between the horizontal ranges IS1 and IS2, each being a values calculated by the subroutine, "pupil assumption range setting". The edge points excluded from the range are branched not to recognize as an edge point of the pupil. Then the process of the current loop variable L is completed.

In the next step (#606), the similar judgment is performed to the coordinates in the vertical direction. If the L-th edge point is within a pupil assumption range, the flow goes to the step (#607). The steps (#607) and (#608) judge whether the coordinate of the L-th edge point is near to the P-image.

XP1, XP2, YP1, and YP2 are values determined by the subroutine "P-image detection". When the coordinate of an edge point is within the horizontal range XP1 to XP2 and the vertical range YP1 to YP2, the flow is branched to terminate the process of the current loop variable L. This process is performed to remove a false pupil edge detected. In the optical system according to the present embodiment, since two P-images is on the upper portion of the pupil circle, the skirt portion of the P-image like a spot image tends to meet the above described pupil edge condition, thus being detected as a false pupil edge.

The coordinate information of edges which have been passed by the steps (#603) to (#608) judges are subjected to the least squares method in the step (#609).

The step (#609) calculates in accordance with the expressions (16) to (24) and (38) to (40) and then counts up the number N of the edges used for the calculation.

In the loop process in the step (#602), when all the memorized edges of (EDGCNT−1) have been processed, the flow goes to the step (#610).

In the next steps (#610), the expressions (25) to (35) and (37) to (41) are applied to calculate the center coordinate (a, b) of a pupil circle and an aberration amount ER.

The flow goes to the next step (#611) to return the subroutine "least-squares assumption of circle".

Referring again to FIG. 22, when the subroutine "least-squares assumption of circle" in the step (#501) is completed, the flow goes to the next step (#502).

In the step (#502), the number N of the data used for the assumption of a circle is compared with the threshold value NTHR. If N<NTHR, it is assumed that the result has a low reliability because of a small number of data. Then the flow is branched to the step (#512) to judge that the detection has been failed. For example, NTHR=30.

In the step (#502), if N≧NTHR, the aberration amount ER is compared with the threshold value ERTHR in the next step (#503).

If ER<ERTHR, it is regarded that the detection result is sufficiently reliable because of the small aberration. Then the flow is branched to the step (#514) and it is judged that the detection has been successful. For example, the threshold value ERTHR=10000.

In the step (#503), if ER≧ERTHR, re-calculation is performed before the step (#504) because data number is sufficient but has too large aberration. It may be considered that the large aberration results from a false edge point out of the pupil circle used for the calculation.

In the step (#504), the subroutine "least-squares presumption of circle; re-calculation 1" is called.

The "least squares presumption of circle; recalculation 1" is a subroutine which performs again the least-squares presumption re-calculation while the edge points (⅕ of the total number) which are on the vertical and upper portion of the area sensor are excluded from the edge points used to calculate the least-square presumption calculation. The flowcharts are shown in FIGS. 24A, 24B, 24C, and 24D.

When the subroutine "least-square presumption of circle; re-calculation 1" is called, the variables are stored in the step (#701) via the step (#700), as shown in Figures.

The variables XS1 to ZS4 store work variable values corresponding to all the edges calculated in the step (#501). The number of the excluded edge points are stored as ⅕ of the number N of all edge points in the variable M. In the step (#702), the calculation work is initialized to go to the step (#703), in the manner similar to the step (#601). The step (#703), a loop process like the step (#602), calculates the edge points excluded in the loop, according to the least-squares method.

According to the present embodiment, since the area sensor has a structure where a reading is performed from the vertical and upper portion, the array variable EDGDT (m, k) vertically stores edge information from and upper portion. Hence, when the m of the EDGDT (m, k) is counted up from 0, it can be taken from the vertical and upper edge point.

In the first step (#704) in the loop of the step (#703), it is judged whether the edge point (X, Y) is effective as a pupil edge. This resembles completely the steps (#603) to (#608).

When it has been judged that the edge point is effective as a pupil edge point, the flow goes to the step (#705) to execute a calculation similar to that in the step (#609).

In the next step (#706), the number N of edge points newly calculated is compared with the number M of edge points to be removed. If the calculation has been performed M times, the flow is branched to stop the loop process in the step (#703). When the number has not reach M, the loop variable L is counted up to continue again the process to the step (#704).

After a calculation has been performed M times, the flow is branched to the step (#708). The center (a, b) of the pupil circle and the aberration amount ER' are re-calculated. The expressions for re-calculation are as follows:

$$X1 = X1S - X1 \tag{16'}$$

$$X2 = X2S - X2 \tag{17'}$$

$$X3 = X3S - X3 \tag{18'}$$

$$Y1 = Y1S - Y1 \tag{19'}$$

$$Y2 = Y2S - Y2 \tag{20'}$$

$$Y3 = Y3S - Y3 \tag{21'}$$

$$Z1 = Z1S - Z1 \tag{22'}$$

$$Z2 = Z2S - Z2 \tag{23'}$$

$$Z3=Z3S-Z3 \quad (24')$$

$$X4=X4S-X4 \quad (38')$$

$$Y4=Y4S-Y4 \quad (39')$$

$$Z4=Z4S-Z4 \quad (40')$$

A new pupil center (a, b) and the aberration amount ER' can be obtained by re-calculating the expressions (25) to (35) and (37) to (41). Since the expressions (16) to (40) are originally in a sequential format, it is not needed to re-calculate all the data. Data to be excluded are subjected to an addition (or a continued addition). Then the resultant value is subtracted from the original value.

After the re-calculation, the flow goes to the step (#709) to return to the subroutine "least-squares presumption; re-calculation 1".

Returning to FIG. 22, when the step (#504) has been completed, the flow goes to the step (#505) to compare the re-calculated aberration amount ER' with the threshold value ERTHR. If ER' is smaller, it is judged that the rejection process has been effective and then the flow is branched to the step (#514). It is judged that the detection has been successful. If ER' is still larger, the flow goes to the step (#506) to call another subroutine "least squares presumption of circle; re-calculation 2".

Figure 24A:
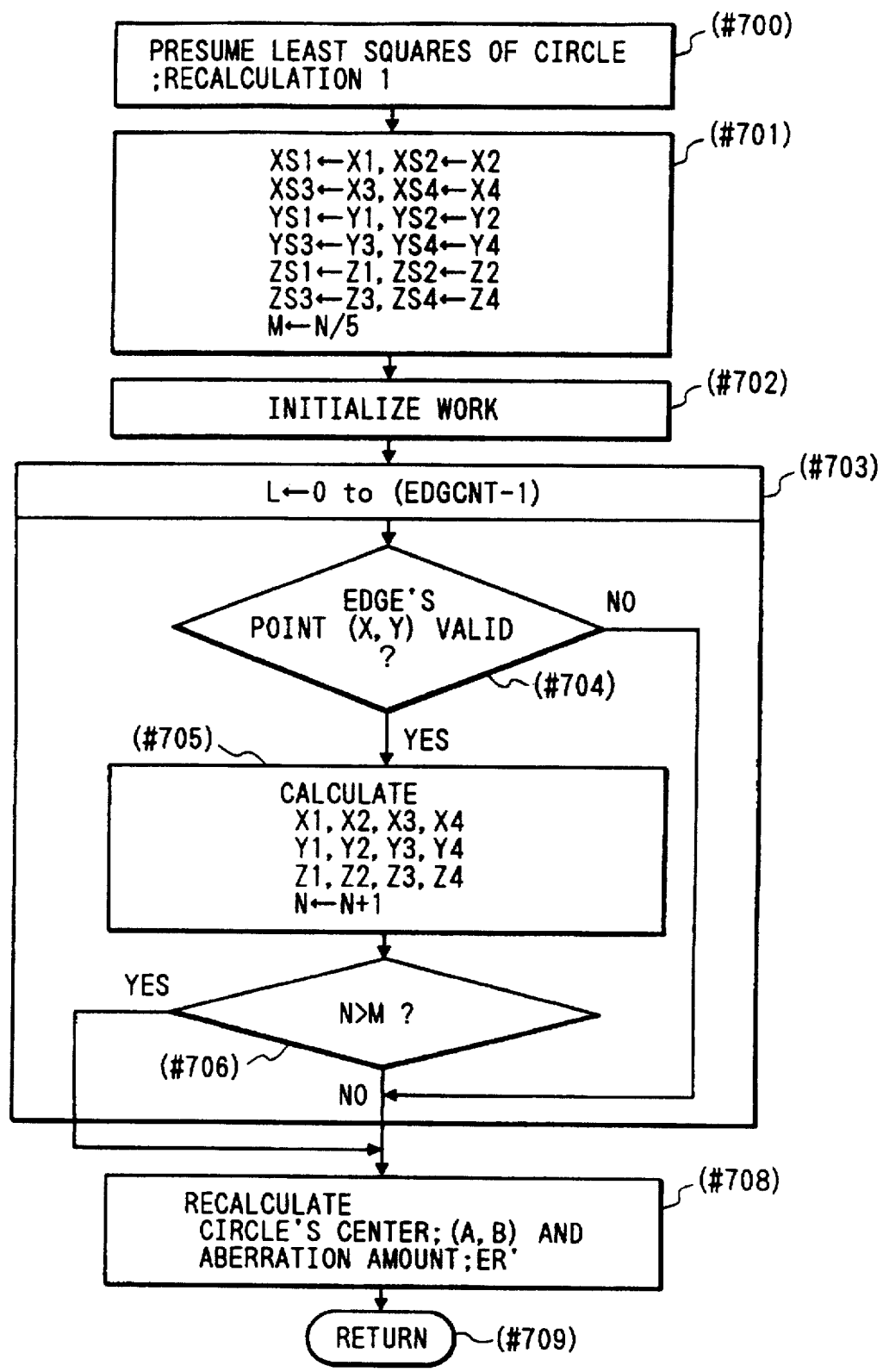
FIG. 24A is a flowchart for removing insufficient points of a pupil edge for calculating a pupil circle.
Figure 24B:
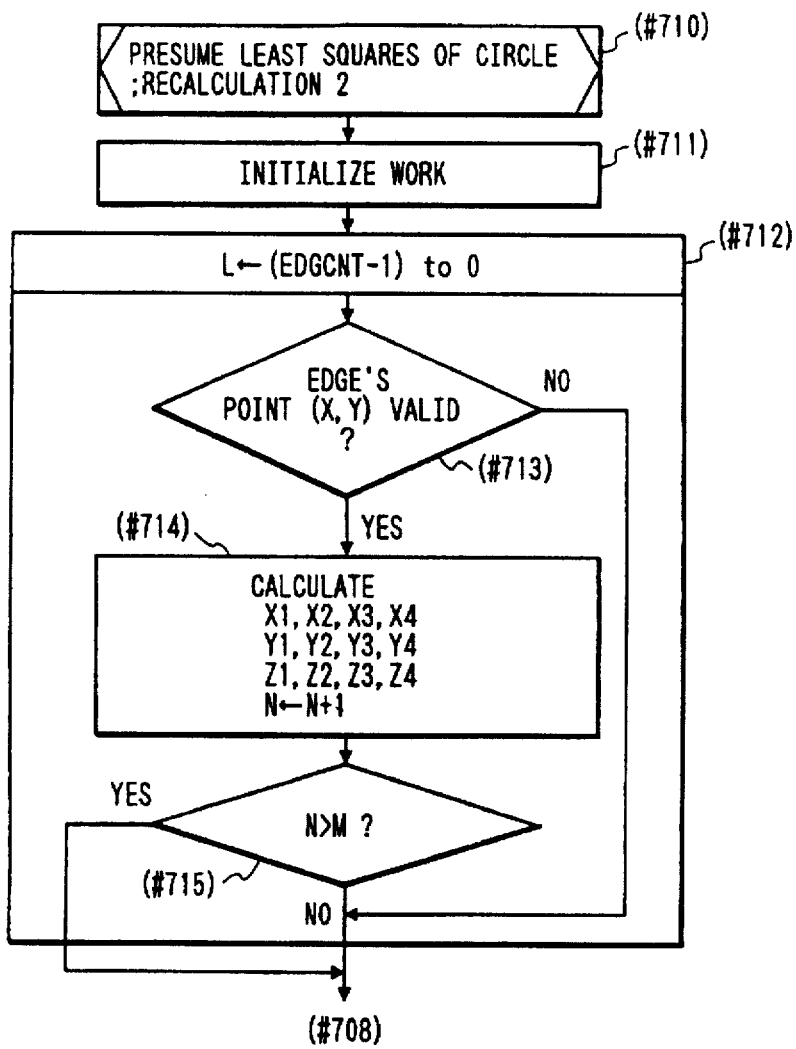
FIG. 24B is a flowchart for removing insufficient points of a pupil edge for calculating a pupil circle.

The "least-squares presumption of circle; recalculation 2" is a subroutine which executes again according to the least-squares presumption calculation while edge points (⅕ of all edge points) on the vertical and lower portion of the area sensor are excluded from the edge points used for the least-squares presumption calculation. The flowchart is shown in FIG. 24B.

The "re-calculation 2" is substantially similar to the "re-calculation 1". Unlike the "re-calculation 1", the loop variable L in the step (#712) is counted down from (EDGCNT−1) because exclusion starts vertically from the lower edge point. Since the other processes are completely similar to that in the "re-calculation 1", the explanation will be omitted.

Referring again to FIG. 22, explanation will be continued below. When the subroutine "least squares presumption of circle; re-calculation 2" in the step (#506) has been completed, the flow goes to the step (#507) to compare the re-calculated aberration amount ER' with the threshold value ERYHR. If ER' is smaller, it is judged that the exclusion process has been effective so that the flow branched to the step (#514). Thus it is regarded that the detection has been successful.

If the aberration amount ER' is still larger, the flow goes to the step (#508) to call further another subroutine "least-squares presumption of circle; re-calculation 3".

Figure 24C:
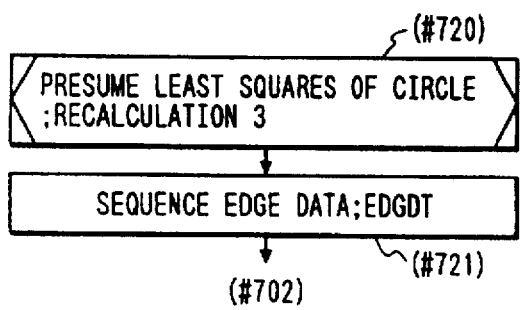
FIG. 24C is a flowchart for removing insufficient points of a pupil edge for calculating a pupil circle.

The "least-squares presumption of circle; recalculation 3" is a subroutine which executes again a least-squares presumption calculation while edge points (⅕ of all edge points) on the horizontal and left portion of the area sensor are excluded from the edge points used for the least-squares presumption calculation. The flowchart is shown in FIG. 24C.

When the subroutine "re-calculation 3" is called, the flow goes to the step (#721) via the step (#720). In the step (#721), the array variables EDGDT (m, k) memorizing the edge information are re-arranged.

As described previously, the EDGDT (m, k) sequentially stores the edge information from the edge point in the vertical direction. Hence rearranging data stored in the EDGDT needs to process with an attention to the horizontal direction.

The horizontal (X-axis coordinate) values at edge points are stored in EDGDT (m, 2). By performing a well-known "sorting process" to the values, the edge information arranged in the horizontal order from the left side can be restored in EDGDT.

The flow goes to the step (#702) after the rearrangement. Thereafter, re-calculation can be executed by performing the same process as the "re-calculation 1" while edge points existing horizontally on the right and left sides on an area sensor are excluded.

Referring again to FIG. 22, when the subroutine "least-squares presumption of circle; re-calculation 3" in the step (#508) is completed, the flow goes to the step (#509) to compare the re-calculated aberration amount ER' with the ERTHR. If ER' is smaller, it is judged that the exclusion process has been effective so that the flow is branched to the step (#514). It is regarded that the detection has been successful.

When the aberration amount ER' is larger, the flow goes to the step (#510) to call another subroutine "least-squares presumption of circle; re-calculation 4".

Figure 24D:
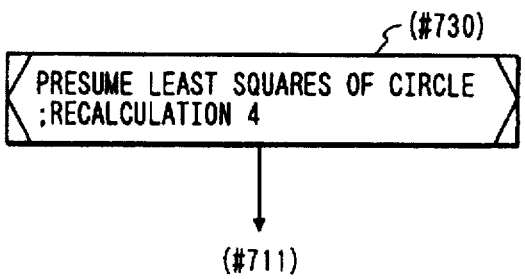
FIG. 24D is a flowchart for removing insufficient points of a pupil edge for calculating a pupil circle.

The subroutine "least-squares presumption of circle; re-calculation 4" is a subroutine which performs again a least-squares presumption calculation while the edge points (⅕ of all edge points) existing on the horizontal and right portion of the area sensor are excluded from the edge points used for the least-squares presumption. The flowchart is shown in FIG. 24D.

The edge points are stored sequentially from the horizontal and left side in the array variable EDGDT (m, k). In order to remove edge points sequentially from the right side, EDGDT (m, k) is treated in the manner similar to the "re-calculation 2". When the subroutine "re-calculation 4" is called, the flow is directly branched to the step (#711) to execute the process similar to "re-calculation 2".

Figure 22:
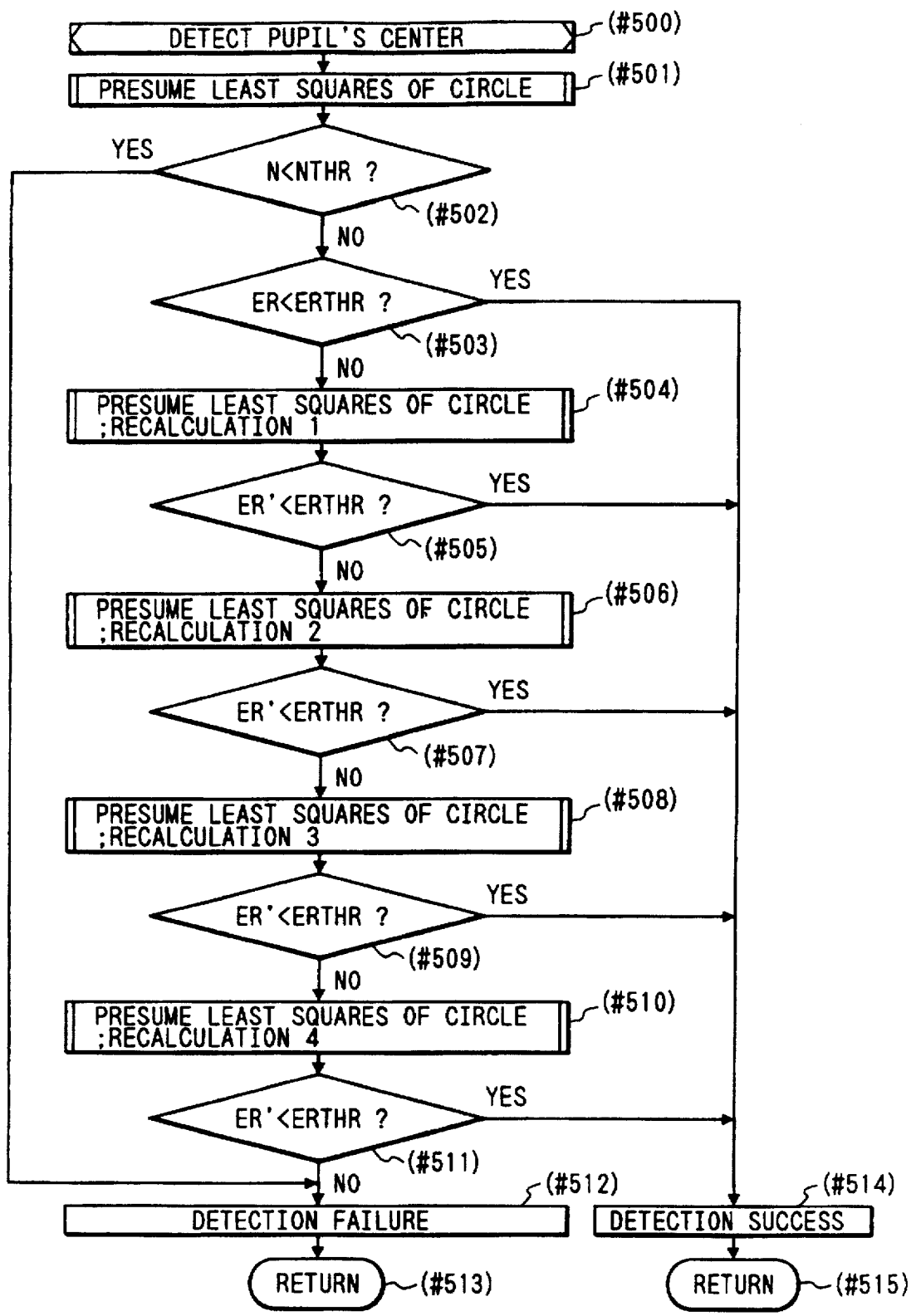
FIG. 22 is a flowchart for performing a visual axis detection according to the present invention, particularly a pupil circle detection operation.

In FIG. 22, when the subroutine "least-squares presumption of circle; re-calculation 4" in the step (#510) is completed, the flow goes to the step (#511) to compare the re-calculated aberration amount ER' with threshold value ERTHR. If ER' is smaller, it is judged that the exclusion operation has been effective. The flow is branched to the step (#514). It is regarded that the detection has been successful.

When the aberration amount ER' is larger, the flow goes to the step (#512). Since the operation has not been effective, the flow goes to the step (#512). It is judged that the detection has been failed.

After the detection of the pupil center has been finally judged in the steps (#512) or (#514), the subroutine "pupil center detection" is returned at the steps (#513) or (#515).

Referring to FIGS. 8A and 8B, when the "pupil center detection" has been completed in the step (#016), the flow goes to the step (#017) to call the subroutine "visual axis detection".

The "visual axis detection" is a subroutine which detects a visual axis (a gazing point), based on the P-image position detected through the above mentioned process and the center position of a pupil circle.

Basically, like the well-known example described previously, the rotational angle Θ of an eyeball optical axis may be calculated in accordance with the expression (2).

According to the present embodiment, the detection is performed to the pupil center two-dimensionally, namely in the horizontal direction (X-axis) and the vertical direction (Y-axis). Hence the visual axis detection can be similarly made in the horizontal direction and in the vertical direction, instead of the well-known example where a visual axis detection is made only in the horizontal direction.

When the visual axis detection is completed, the flow goes to the step (#018), a series of processes is terminated.

According to the first embodiment, the approximate position of a P-image can be detected by previously reading both a peak value of the horizontal line and a peak value of the vertical line prior to a main reading operation. Therefore since the reading process is performed within a limited area, the detection time can be largely reduced. Moreover, since the maximum value (EYEMAX) of all pixels can be calculated based on the peak value, the reliability in detection of the P-image and the pupil edge can be largely increased.

According to the above embodiments, in the step (#008), a limited area is determined by using values $\delta_{a1}$, $\delta_{b1}$, and $\delta_{b2}$ together with the y-coordinate (y1, y2) at the maximum point of a horizontal line peak value and the x-coordinate (x1, x2) at the maximum point of a vertical line peak value, whereby a pupil circle is always defined within the limited area, as shown in FIG. 11.

Figure 12:
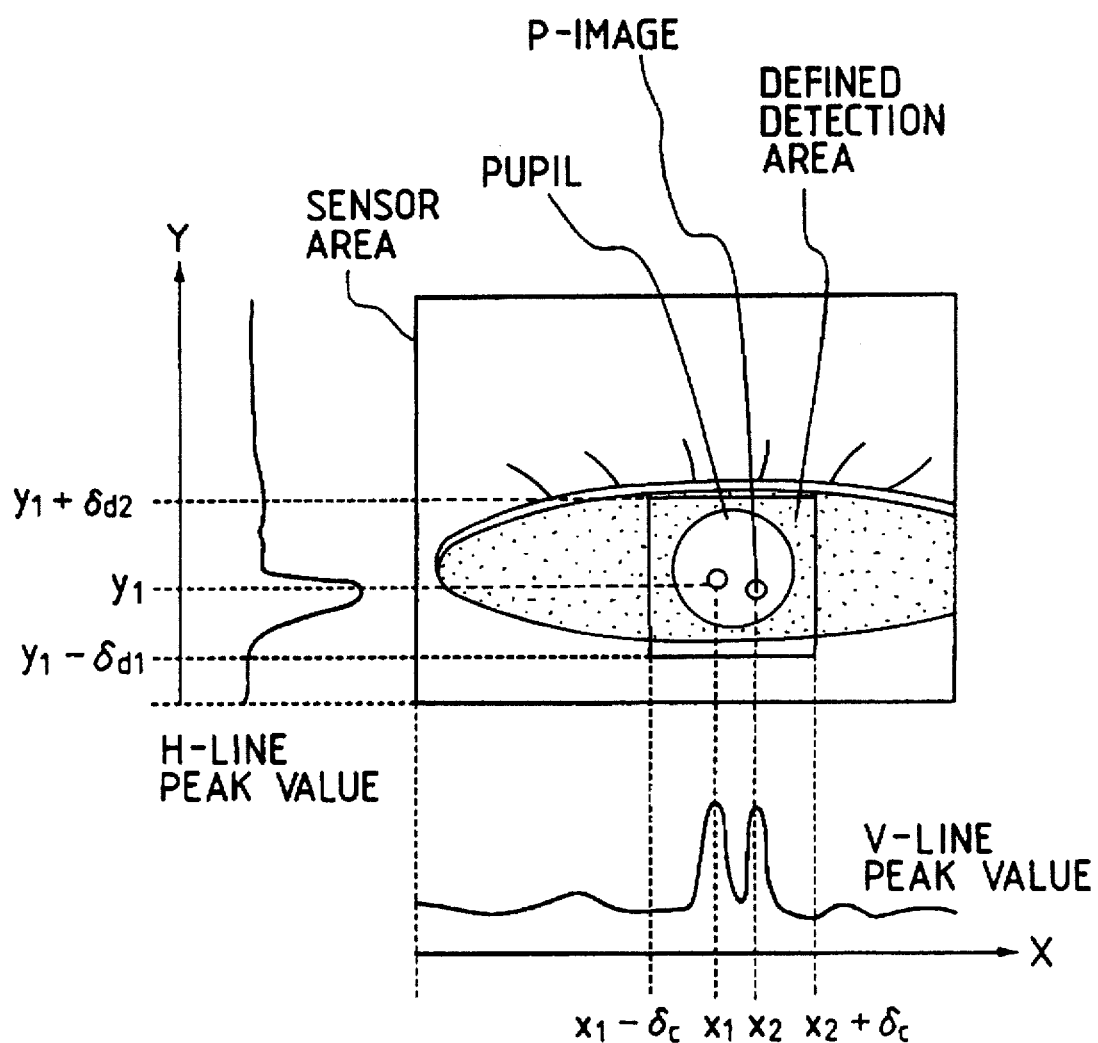
FIG. 12 is an explanatory diagram for setting an area (limited detection area) in the area sensor according to the present invention.

However, when an observer's eye is more relatively distant from the viewfinder system, the eyeball's image of IMAGE-EYE becomes relatively small, as shown in FIG. 12. As a result, the relative distance between two P-images becomes small and the x-coordinate (x1, x2) of maximum of V-Line peak value is relatively small. Therefore, in a case, the two P-images may be viewed as one piece, not being as split two images. In such a case, since the size of the pupil circle becomes relatively small certainly, it is desirable to vary the limited area determining constant.

For example, when the limited area on the Y-coordinate $(y_1-\delta_{d1})$ to $(y_1+\delta_{d2})$, and the X-coordinate $(x_1-\delta_c)$ to $(x_2+\delta_c)$, $\delta$ value being a function with a variable (x2-x1) is as follows:

$$\delta_{d1}=f_{d1}(x_2-x_1)$$

$$\delta_{d2}=f_{d2}(x_2-x_1)$$

$$\delta_c=f_c(x_2-x_1)$$

In the embodiment, when the observer's eye 15 is relatively distant from the viewfinder, the limited area becomes narrow, so that the visual axis detection time can be shortened.

Figure 13:
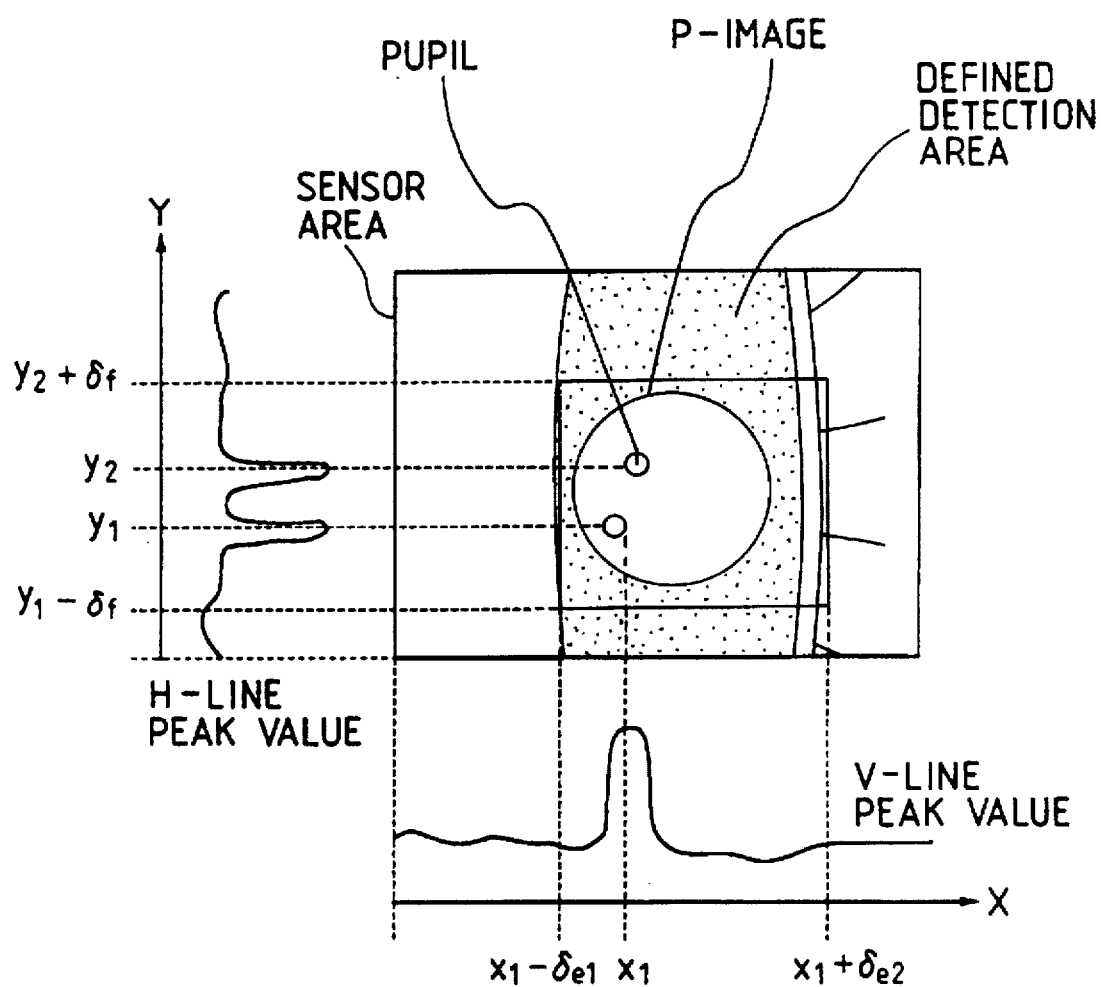
FIG. 13 is an explanatory diagram for setting an area (limited detection area) in the area sensor according to the present invention.
Figure 14:
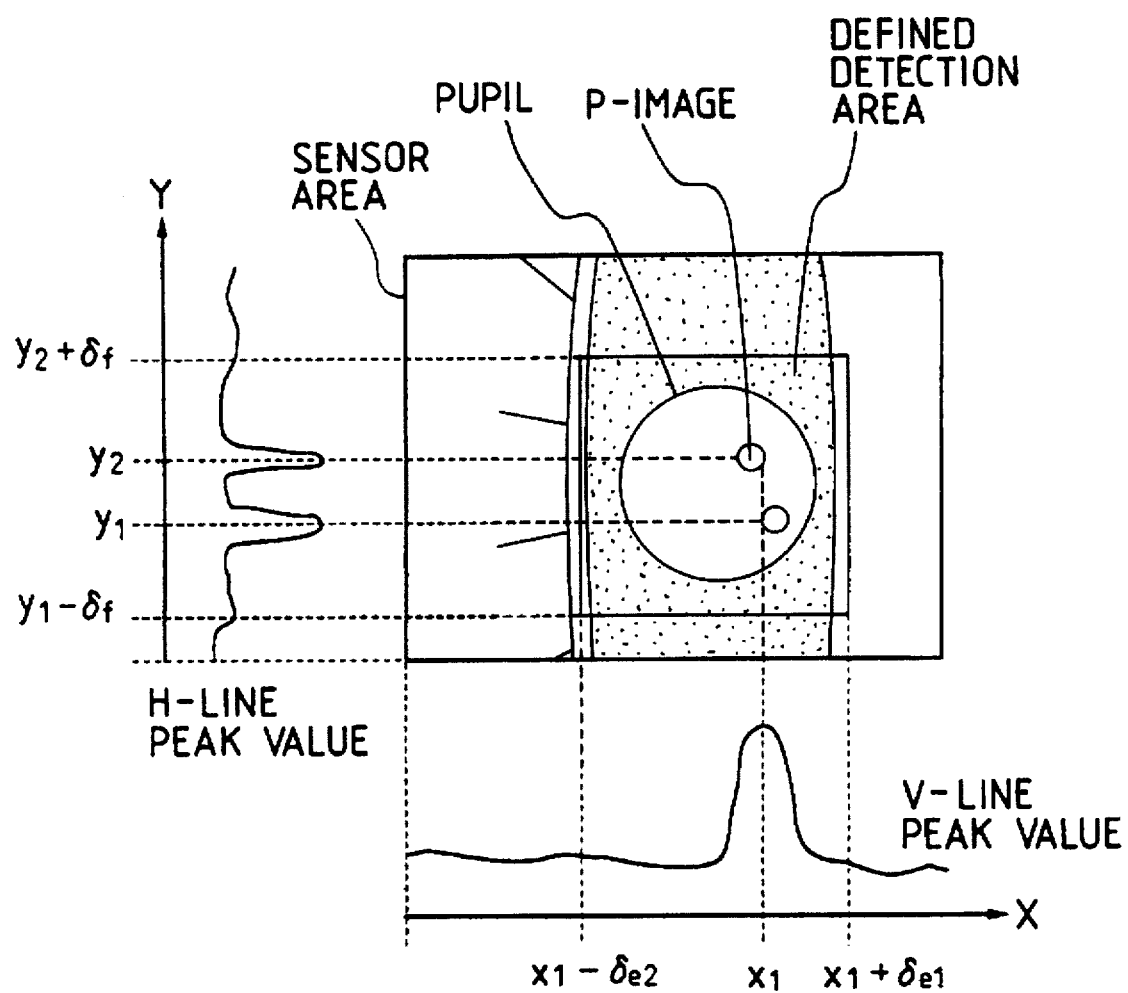
FIG. 14 is an explanatory diagram for setting an area (limited detection area) in the area sensor according to the present invention.

The embodiment 1 shows a camera horizontally arranged. FIGS. 13 and 14 show an example that a camera is vertically arranged. This corresponds to the case where the condition in the step (#008) shown in FIGS. 8A and 8B is rewritten as follows:

$$JL1 \leftarrow y_1-\delta_f$$
$$JL2 \leftarrow y_2+\delta_f$$
$$IL1 \leftarrow x_1-\delta_{e1}$$
$$IL2 \leftarrow x_1+\delta_{e2}$$

or $$JL1 \leftarrow y_1-\delta_f$$
$$JL1 \leftarrow y_2+\delta_f$$
$$IL1 \leftarrow x_1-\delta_{e2}$$
$$IL2 \leftarrow x_1+\delta_{e1}$$

where $\delta_f$, $\delta_{e1}$, and $\delta_{e2}$ are a constant for vertical position, respectively. Like the embodiment 1, the pupil circle is set so as to arranged certainly within a limited area.

Figure 15:
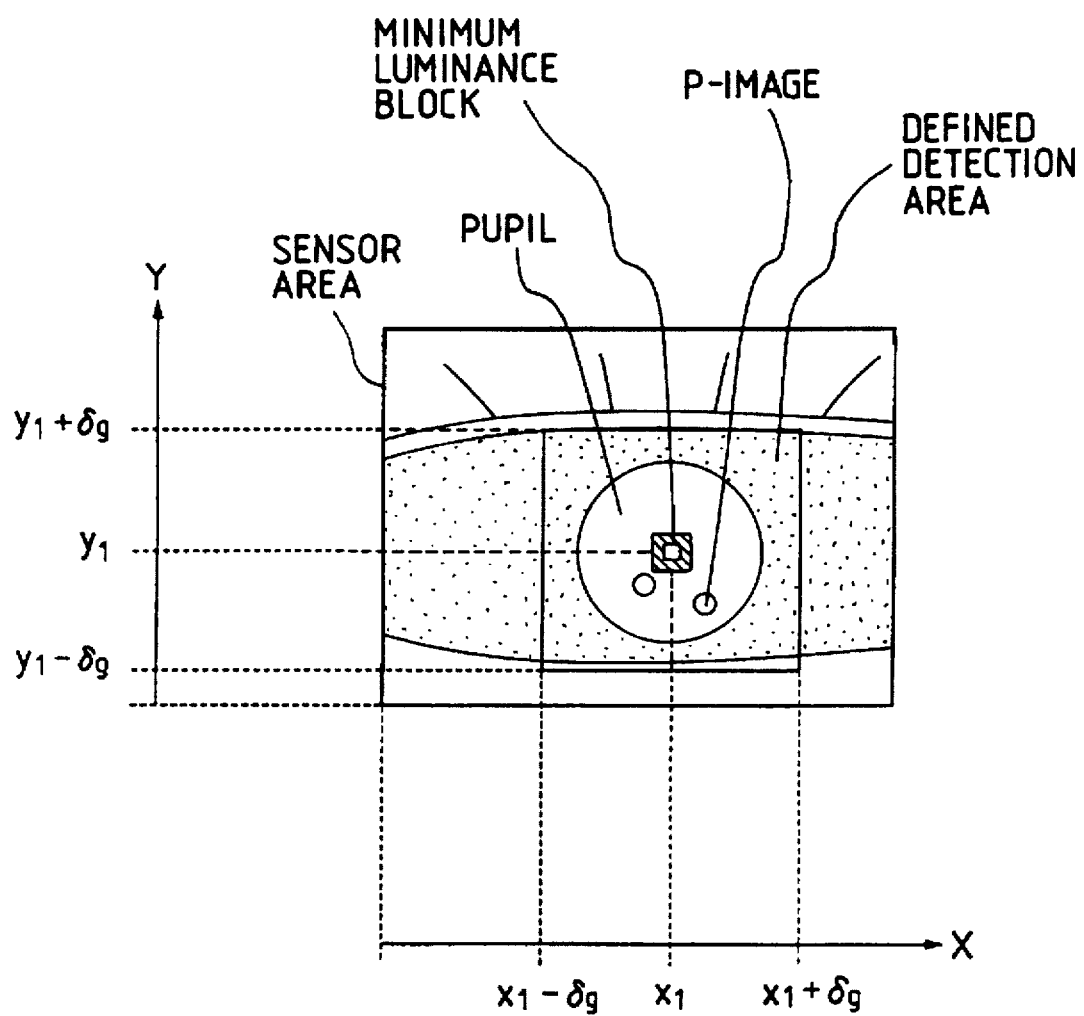
FIG. 15 is an explanatory diagram for setting an area (limited detection area) in the area sensor according to the present invention.
Figure 16:
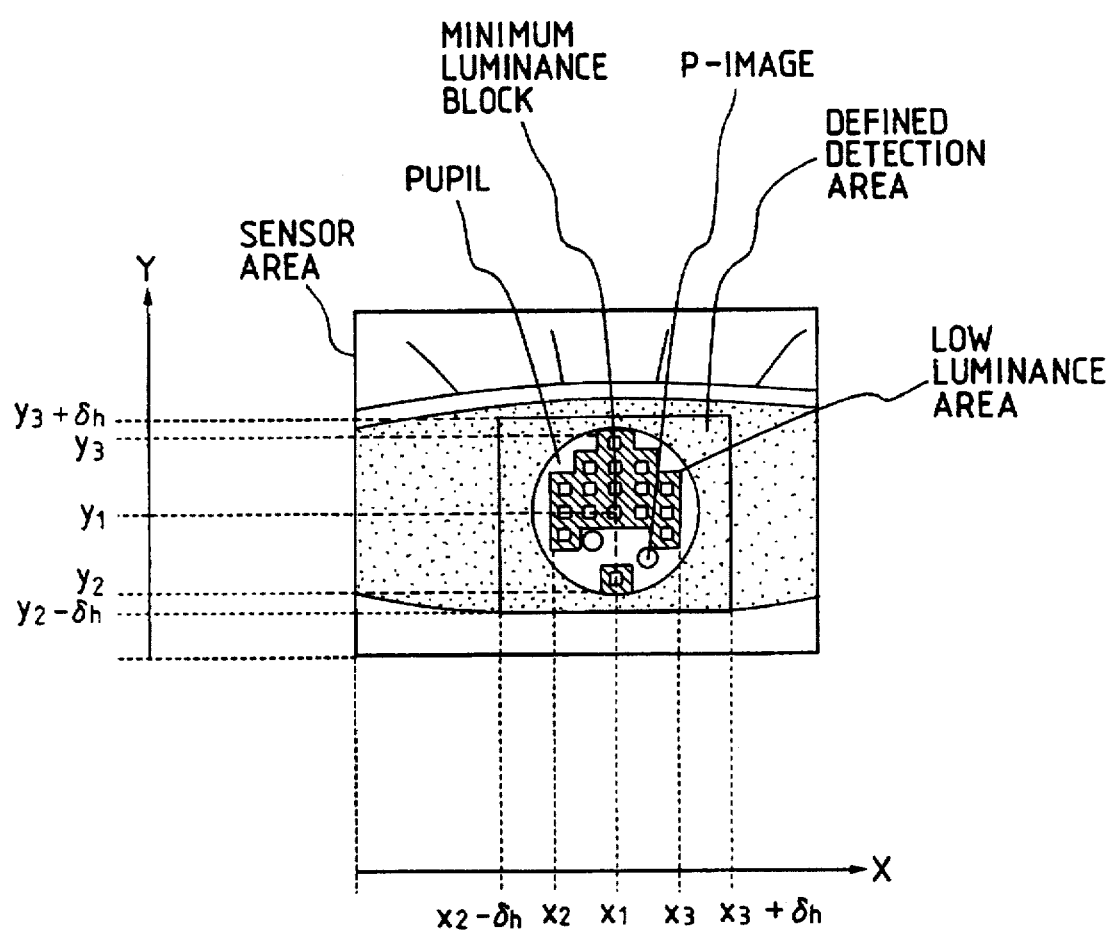
FIG. 16 is an explanatory diagram for setting an area (limited detection area) in the area sensor according to the present invention.

In FIG. 16, the vertical direction is different from that in FIG. 15, and a P-image is formed on the right or left side of the pupil circle. The camera is selectively detected by two attitude detection switches SW-HV1 and SW-HV2.

In the above embodiment, an area where a signal process is performed to the position as the center of a possible (presumed) P-image on the horizontal or vertical lines, or the position indicating a maximum luminance value, is determined. Next, on the basis of a view that the pupil center portion indicates the lowest luminance value, an embodiment will be hereinafter explained that a block signal by dividing the area into each of plural pixels is used to set an area for processing a signal by defining a position for indicating a low luminance value as a center portion.

Figure 9:
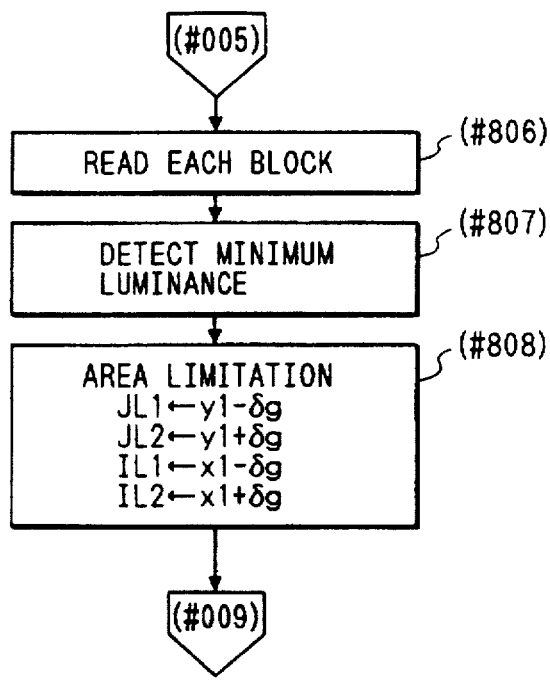
FIG. 9 is a flowchart for the visual axis detection according to the present invention.

FIG. 9 is a flowchart in which the flow (#006 to #008) shown in FIGS. 8A and 8B in the embodiment is substituted based on the above view.

The flow goes to the step (#806) via the step (#005). Then each block is read, as described in FIGS. 3 and 4.

In the step (#807), the lowest value (EYEMIN) and the coordinate (x1, y1) are calculated based on each block signal preceding the visual axis detection process.

In the step (#808), as shown in FIG. 15, the limited area (limited detection area) is determined as follows:

$$JL1 \leftarrow y_1-\delta_g$$
$$JL2 \leftarrow y_1+\delta_g$$
$$IL1 \leftarrow x_1-\delta_g$$
$$IL2 \leftarrow x_1+\delta_g$$

where $\delta_g$ is a value set to always arrange a pupil edge within a limited area.

Other processes are substantially same as that in the embodiment 1. Accordingly, herein a routine for calculating the lowest luminance value (EYEMIN) in the step (#108 to #109) in FIG. 18 and a routine for reviewing the edge candidate in the step (#603) are omitted and thereafter the value caluculated in the step (#807) is used as the EYEMIN value.

Contrary, since the highest luminance value (EYEMAX) is not known predeterminedly, the P-image condition judging constants C1 and C2 in the step (#202), shown in FIG. 9, have always the same value, without being calculated based on EYEMAX. EYEMAX also cannot be used to calculate the edge condition judging constant C4 in the steps (#303) and (#304), shown in FIG. 20.

Hence the reliability to extract the P-image and the pupil edge may be degraded somewhat. For example, the constants C1, C2, and C3 are set to be C1=230, C2=200, and C3=20, respectively.

FIG. 15 shows diagramatically the relationship between the eyeball image and the lowest luminance block in the embodiment 4. As apparent in FIG. 15, the block showing the lowest luminance value is selected in advance to set a possible area in which a pupil will be included from the selected position. Then an actual visual axis detection is performed in the set area.

In the following embodiment, an explanation will be made as for how to determine a limited area with a value (EYELow) larger than the lowest luminance value (EYEMIN) by a predetermined value (refer to FIG. 16).

Figure 10:
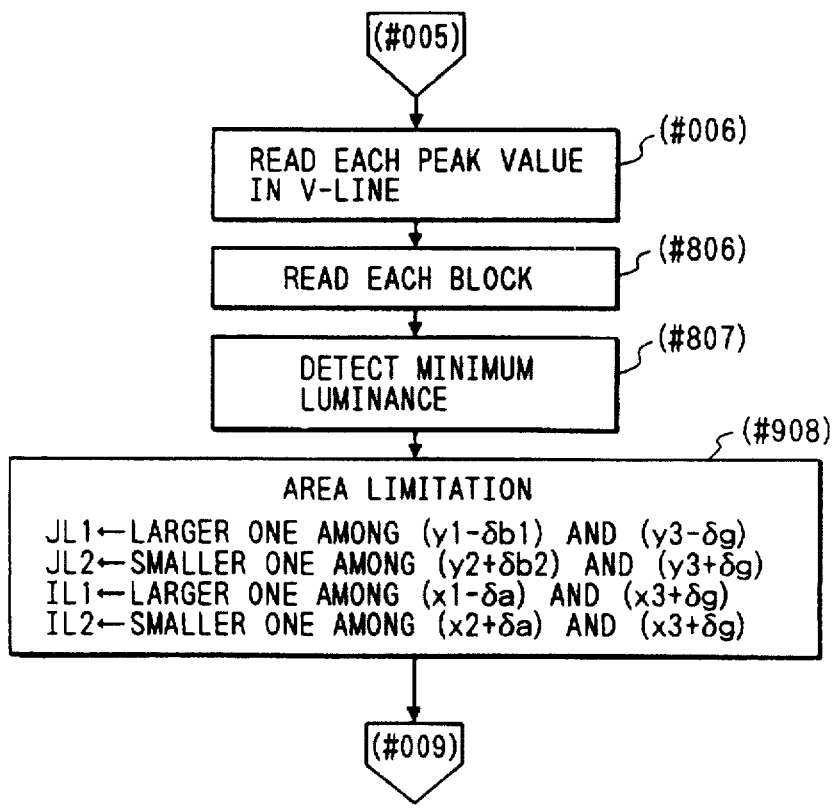
FIG. 10 is a flowchart for the visual axis detection according to the present invention.

If (EYELow)←(EYEMIN)+C6, where, for example, C6=15, all block signals less than (EYELow) can be treated as pixels in a pupil. The limit X and Y coordinates on which the block signals less than EYELow exist are calculated, the X-coordinate being between x2 and x3 on the X-axis and the Y-coordinate being between y2 and y3 on the Y-axis. In the step (#808), the effect similar to that in the above embodiment can be provided by the following expressions:

$JL1 \leftarrow x_2 - \delta_h$ $JL2 \leftarrow x_3 + \delta_h$ $IL1 \leftarrow y_2 - \delta_h$ $IL2 \leftarrow y_3 + \delta_h$ FIG. 10 shows a flowchart for an embodiment utilizing the feature of a block signal indicating both the above-mentioned H-V-Line peak value and a low luminance information. In the flowchart, only features different from that in the embodiment 1 shown in FIGS. 8A and 8B are extracted.

Following the step (#006), operation is made as for reading each block, the same step as that shown in FIG. 9, and detecting the lowest luminance position in the step (#807). The lowest luminance block has the coordinate (x3, y3)

Figure 17:
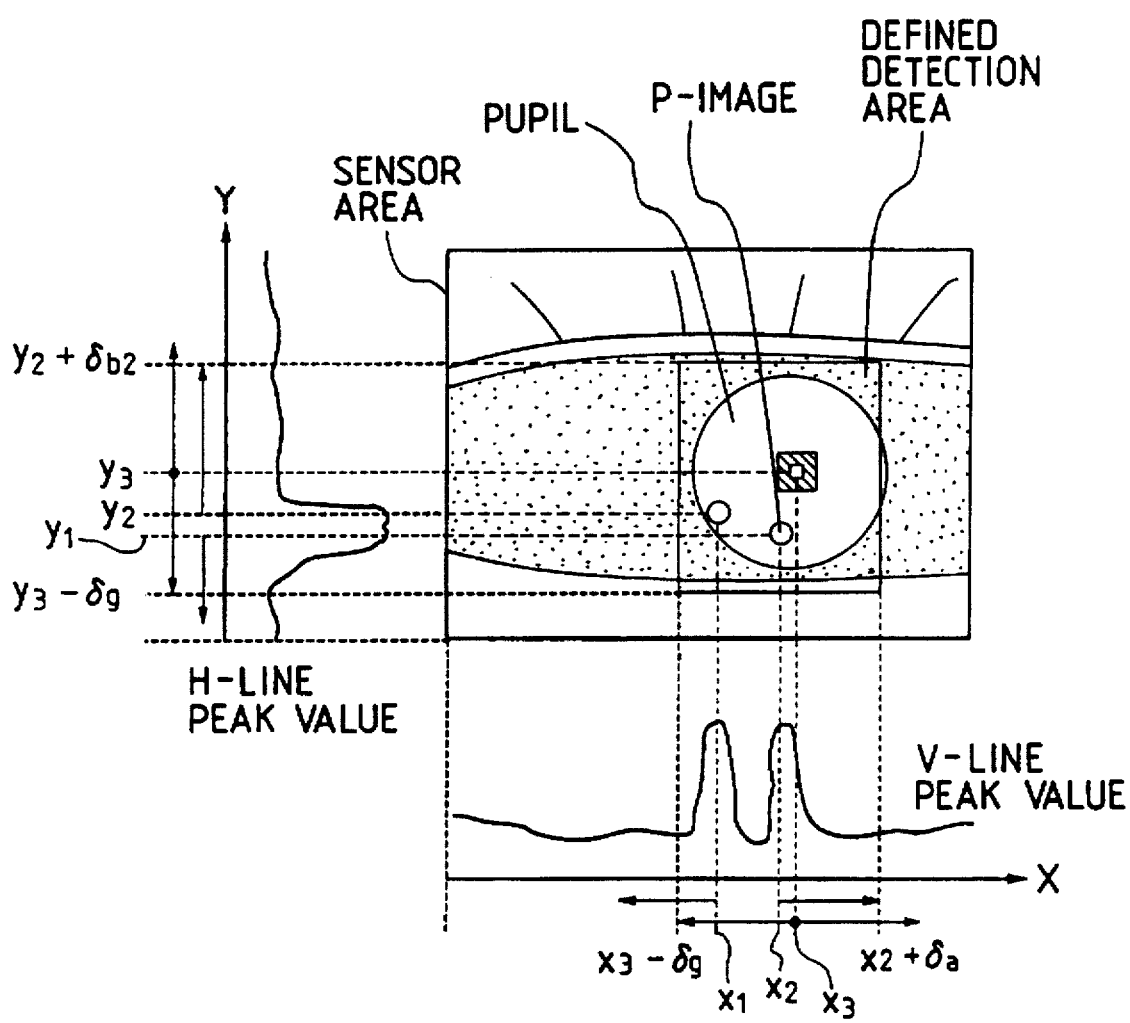
FIG. 17 is an explanatory diagram for setting an area (limited detection area) in the area sensor according to the present invention.

The area limitation in the step (#908) are as follows:

$JL1 \leftarrow$ Larger one of coordinates $(y_1 - \delta_{b1})$ and $(y_3 - \delta_g)$ $JL1 \leftarrow$ Smaller one of coordinates $(y_2 + \delta_{b2})$ and $(y_3 + \delta_g)$ $IL1 \leftarrow$ Larger one of coordinates $(x_1 - \delta_a)$ and $(x_3 - \delta_g)$ $IL2 \leftarrow$ Smaller one of coordinates $(x_2 + \delta_b)$ and $(x_3 + \delta_g)$ In the embodiment 1 and the embodiment wherein a block signal indicating the lowest luminance value, the area is defined to be somewhat larger one to apply to all the cases of area limitation. However, in above case, the area is limited to a smaller space. FIG. 17 diagramatically shows the aspect. Especially, this method is effective in the case where two P-images are inclined toward the right or left side with respect to the pupil circle. The limited areas are determined as follows:

$JL1 \leftarrow y_3 - \delta_g$ $JL2 \leftarrow y_2 + \delta_{b2}$ $IL1 \leftarrow x_3 - \delta_g$ $IL2 \leftarrow x_2 + \delta_a$ This method can further make the visual axis detection time shorten. Moreover since EYEMAX and EYEMIN are predeterminedly known, time reduction and improved reliability can be realized.

As described above, before the image sensor reads signals, the positions of a P-image and a pupil are previously roughly estimated by reading the peak value and the block signal of each line. Before the main reading operation, the limited area signal is read to extract the maximum luminance value and the minimum luminance value. Thus the visual axis detection device with high reliability can be largely shortened the visual axis detection time.

What is claimed is:

1. A signal processing apparatus comprising:
   area-type sensor means having plural photoelectric conversion elements;
   setting means for setting a limited read out area within an area of said area-type sensor means on the basis of a characteristic output signal, the limited read out area being smaller than the area of said area-type sensor means; and
   signal processing means for signal-processing a signal of each photoelectric conversion element of the limited read out area.

2. A signal processor according to claim 1, wherein said signal processing means converts an analog signal output by said photoelectric conversion signal elements into a digital signal.

3. A signal processor according to claim 1, wherein said characteristic output signal includes a highest level signal.

4. A signal processor according to claim 1, wherein said characteristic output signal includes a lowest level signal.

5. A signal processor according to claim 2, wherein said signal processing means forms information regarding an eyeball, based on the digital signal.

6. A signal processor according to claim 5, wherein said signal processing means executes a signal process to detect a visual axis.

7. A signal processor according to claim 1, wherein said characteristic signal includes a highest level signal among the signals output from each of photoelectric conversion elements in said area sensor.

8. A signal processor according to claim 1, wherein said characteristic signal includes a lowest level signal among the signals output from photoelectric conversion elements in said area sensor.

9. A visual axis detecting apparatus comprising:
   area sensor means having plural photoelectric conversion elements to receive light from an eye;
   setting means for setting a limited read out area within an area of said area sensor means on the basis of a signal indicating a characteristic portion of said eye, the limited read out area being smaller than the area of said area sensor means; and
   signal processing means for signal-processing the signal in the limited read out area to detect a visual axis.

10. A signal processor according to claim 9, wherein said signal processing means converts an analog signal of said photoelectric conversion elements into a digital signal.

11. A signal processor according to claim 9, wherein the signal indicating the characteristic portion includes a higher level signal.

12. A signal processor according to claim 9, wherein the signal indicating the characteristic portion is a lower level signal.

13. A signal processor according to claim 9, wherein the signal indicating the characteristic portion is a highest level signal among signals output from each of said photoelectric conversion elements in said area sensor.

14. A signal processor according to claim 9, wherein the signal indicating the characteristic portion is a lowest level signal among signals output from each of said photoelectric conversion elements in said area sensor.

15. A signal processing apparatus according to claim 1, wherein said area-type sensor means is divided into a plurality of blocks on the basis of the characteristic output signal, which includes at least one of positional signals selected from among the output signals from each of said plurality of blocks.

16. A signal processing apparatus according to claim 15, wherein the characteristic output signal includes a positional signal for a block for outputting a comparatively high level signal from among the output signals from each of said plurality of blocks.

17. A signal process apparatus according to claim 15, wherein the characteristic output signal includes a positional signal for a block for outputting a comparatively low level signal from among the output signals from each of said plurality of blocks.

18. A signal processing apparatus comprising:
   area-type sensor means having plural photoelectric conversion elements;
   signal processing means for dividing said sensor means into a plurality of small blocks to process output signals for each of said plurality of small blocks; and setting means for setting a read-out area of said area-type sensor means, wherein said area sensor means is divided into a plurality of blocks, and wherein the read out area is set on the basis of a signal output from said plurality of blocks.

19. A signal processing apparatus according to claim 18, wherein each of said plurality of blocks comprises plural photoelectric conversion elements.

20. A signal process apparatus according to claim 18, further comprising detecting means for detecting a visual axis on the basis of signal of each element of the read-out area.

21. A signal processing apparatus according to claim 9, further comprising setting means for setting a read-out area of said area-type sensor means, wherein said area sensor means is divided into a plurality of blocks, and wherein the read out area is set on the basis of a signal output from said plurality of blocks.

22. A signal processing apparatus comprising:

an area-type sensor having plural photoelectrical changing elements; and a processing circuit that reads out signals for respective blocks of said area sensor, each block including a plurality of photoelectrical changing elements from among said plural photoelectrical changing elements, selects blocks of photoelectrical changing elements to be signal-processed on the basis of a comparison between the signals for the respective blocks and a signal of a characteristic block of photoelectrical changing elements, and signal-processes a signal of each of said plural photoelectrical changing elements in said selected blocks.

23. An apparatus according to claim 22, wherein said area-type sensor comprises plural blocks of photoelectrical changing elements to be signal-processed, and an area of each of said plural blocks is smaller than an overall area of said area-type sensor.

24. An apparatus according to claim 23, wherein said processing circuit changes a signal of each photoelectrical changing element read out into a digital signal.

25. An apparatus according to claim 22, wherein a signal level of the signal of said characteristic block is greater than a signal level of a signal for all other blocks.

26. An apparatus according to claim 22, wherein a signal level of the signal of said characteristic block is less than a signal level of a signal for all other blocks.

27. A visual axis detecting apparatus comprising:

an area-type sensor having plural photoelectrical changing elements; and a processing circuit that reads out signals for respective blocks of said area sensor, each block including a plurality of photoelectrical changing elements from among said plural photoelectrical changing elements, selects blocks of photoelectrical changing elements to be signal-processed on the basis of a comparison between the signals for the respective blocks and a signal of a characteristic block when a visual axis is detected, and that signal-processes a signal of each of said plural photoelectrical changing elements in the selected blocks.

28. An apparatus according to claim 27, wherein said area-type sensor comprises plural blocks of photoelectrical changing elements to be signal-processed, and an area of each of said plural blocks is smaller than an overall area of said area-type sensor.

29. An apparatus according to claim 27, wherein said processing circuit changes a signal of each photoelectrical changing element read out into a digital signal.

30. An apparatus according to claim 27, wherein a signal level of the signal of said characteristic block is greater than a signal level of a signal for all other blocks.

31. An apparatus according to claim 27, wherein a signal level of the signal of said characteristic block is less than a signal level of a signal for all other blocks.

32. A visual axis detecting apparatus comprising:

an area-type sensor having plural photoelectrical changing elements; and a processing circuit that reads out signals for respective blocks of said area-type sensor, each block including a plurality of photoelectrical changing elements from among said plural photoelectrical changing elements, and signal-processes a signal of each of the plurality of photoelectrical changing elements of selected ones of the respective blocks on the basis of a comparison of between the signals for the respective blocks and a characteristic block signal in order to detect a visual axis.

33. An apparatus according to claim 32, wherein a signal level of said characteristic block signal is greater than a signal level of a signal for all other blocks.

34. An apparatus according to claim 32, wherein a signal level of said characteristic block signal is less than a signal level of a signal for all other blocks.

35. An apparatus according to claim 32, wherein said processing circuit detects a pupil of an eye on the basis of said characteristic block signal.

* * * * *

UNITED STATES PATENT AND TRADEMARK OFFICE
CERTIFICATE OF CORRECTION

PATENT NO. : 5,719,388
DATED : February 17, 1998
INVENTOR(S) : TATSUYUKI TOKUNAGA It is certified that error appears in the above-identified patent and that said Letters Patent is hereby corrected as shown below:

Column 1

Line 33, "to" should read --to as--.

Column 3

Line 1, "compensate" should read --compensate for--.
　　　Line 7, "a" should be deleted.

Column 6

Line 7, "more large" should read --larger possible--.

Column 13

Line 53, "are" should read --is--.

Column 14

Line 25, "till" should be deleted.
　　　Line 46, "till" should be deleted.

UNITED STATES PATENT AND TRADEMARK OFFICE
CERTIFICATE OF CORRECTION

PATENT NO. : 5,719,388

DATED : February 17, 1998

INVENTOR(S) : TATSUYUKI TOKUNAGA

It is certified that error appears in the above-identified patent and that said Letters Patent is hereby corrected as shown below:

<u>Column 16</u>

Line 9, "again" should read --again to--.
    Line 49, "Judged" should read --judged--.

<u>Column 17</u>

Line 65, "are" should read --is--.

<u>Column 20</u>

Line 67, "that information" should read -- in which information is--.

<u>Column 21</u>

Line 9, "Judged" should read --judged--.
    Line 24, "as" should be deleted.
    Line 51, "steps" should read --step--.
    Line 64, "been" should be deleted.

UNITED STATES PATENT AND TRADEMARK OFFICE
CERTIFICATE OF CORRECTION

PATENT NO. : 5,719,388

DATED : February 17, 1998

INVENTOR(S) : TATSUYUKI TOKUNAGA

It is certified that error appears in the above-identified patent and that said Letters Patent is hereby corrected as shown below:

Column 25

Line 24, "a" should read --one--.
    Line 25, "not being as" should read --not as being--.
    Line 26, "split two images." should read --two split images--.
    Line 31, "(x2-x1)" should read --$x_2-x_1)$--.
    Line 34, "$(X_2-x_1)$" should read --$(x_2-x_1)$--.

Column 26

Line 38, "Contrary," should read --On the contrary,--.

Column 27

Line 17, "are" should read --is--.
    Line 56, "read out" should read --read-out--.
    Line 58, "read out" should read --read-out--.
    Line 63, "read out" should read --read-out--.

Column 28

Line 21, "read out" should read --read-out--.
    Line 25, "read out" should read --read-out--.
    Line 28, "read out" should read --read-out--.

UNITED STATES PATENT AND TRADEMARK OFFICE
CERTIFICATE OF CORRECTION

PATENT NO. : 5,719,388
DATED : February 17, 1998
INVENTOR(S) : TATSUYUKI TOKUNAGA It is certified that error appears in the above-identified patent and that said Letters Patent is hereby corrected as shown below:

<u>Column 29</u>

```
Line 5,  "read out" should read --read-out--.
Line 12, "signal" should read --signals--.
Line 21, "read out" should read --read-out--.
```

<u>Column 30</u>

```
Line 39, "comparison of" should read --comparison--.
```

Signed and Sealed this

Twenty-fifth Day of August, 1998

*Attest:*

BRUCE LEHMAN

*Attesting Officer*    *Commissioner of Patents and Trademarks*